(12) United States Patent
Armstrong

(10) Patent No.: US 7,499,995 B2
(45) Date of Patent: Mar. 3, 2009

(54) MANAGING PERMISSION FOR ACCESSING THIRD PARTY APPLICATIONS ON A TELECOMMUNICATIONS NETWORK

(75) Inventor: Benjamin Edward Armstrong, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 11/168,588

(22) Filed: Jun. 28, 2005

(65) Prior Publication Data

US 2006/0293034 A1     Dec. 28, 2006

(51) Int. Cl.
*G06F 15/173* (2006.01)
(52) U.S. Cl. .......................... 709/224; 725/60; 725/61; 455/418; 455/419
(58) Field of Classification Search .............. 455/414.1, 455/414.2
See application file for complete search history.

(56) References Cited

U.S. PATENT DOCUMENTS

| | | | |
|---|---|---|---|
| 6,473,086 B1 * | 10/2002 | Morein et al. ............... 345/505 |
| 7,185,087 B2 * | 2/2007 | Gourraud .................... 709/224 |
| 7,206,570 B2 * | 4/2007 | Voehringer ................. 455/407 |
| 2002/0146096 A1 * | 10/2002 | Agarwal et al. .......... 379/88.13 |
| 2003/0046273 A1 * | 3/2003 | Deshpande .................... 707/3 |
| 2003/0191868 A1 * | 10/2003 | Espino ........................ 709/328 |
| 2003/0225871 A1 * | 12/2003 | Calinov et al. .............. 709/223 |
| 2004/0043753 A1 * | 3/2004 | Wake et al. ................. 455/406 |
| 2004/0258031 A1 * | 12/2004 | Zabawskyj et al. .......... 370/338 |
| 2004/0259534 A1 * | 12/2004 | Chaudhari et al. ........ 455/414.1 |
| 2006/0116139 A1 * | 6/2006 | Appelman ................... 455/466 |
| 2007/0232263 A1 * | 10/2007 | Chandhok et al. ........... 455/406 |

* cited by examiner

*Primary Examiner*—Vincent P Harper
*Assistant Examiner*—Mazda Sabouri
(74) *Attorney, Agent, or Firm*—John R. Pivnichny; Dillon & Yudell LLP

(57) ABSTRACT

A method and system are presented that controls which TPAs are authorized to access user data and execute services provided by a service delivery platform in a telecommunications network. The method defines a level of access authorized for each user to protect the privacy of data that populates the TPA.

20 Claims, 24 Drawing Sheets

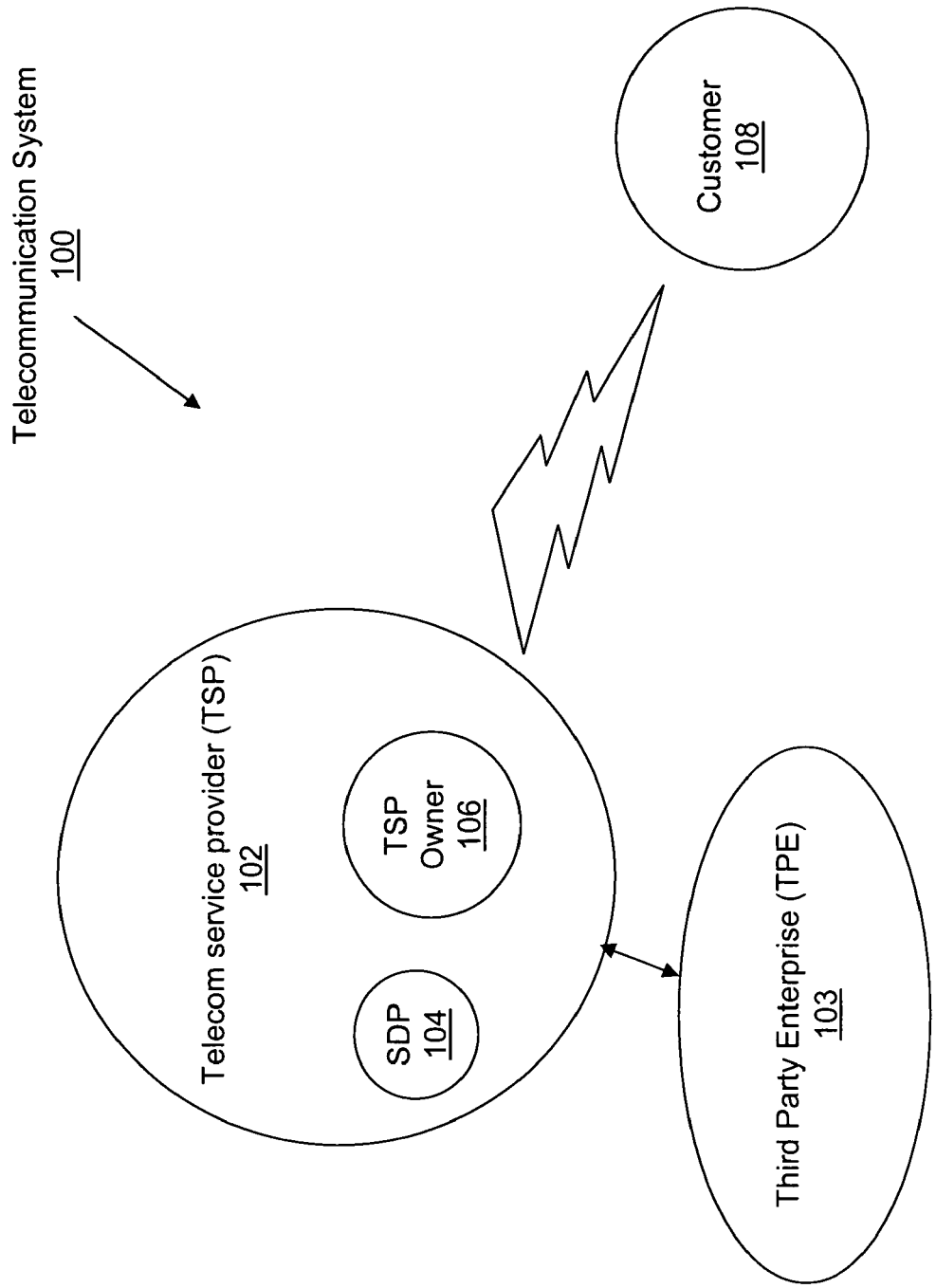

MANAGING PERMISSION FOR ACCESSING THIRD PARTY APPLICATIONS ON A TELECOMMUNICATIONS NETWORK

BACKGROUND OF THE INVENTION

1. Technical Field

The present invention relates in general to the field of telecommunications, and in particular to telecommunication networks that offer services from third parties. Still more particularly, the present invention relates to a method and system for controlling which Third Party Applications (TPA) can access a user's device (e.g., location, presence) on the telecommunications network and execute services for which the device will be billed on behalf of that user (e.g., create a voice call or send a message)

2. Description of the Related Art

A common trend in telecommunication services, including cellular phone services, is to offer more than simple voice service. Telecommunication services now offer games, voice mail, text messaging, directory assistance, Global Positioning System (GPS) based maps/directions, etc. A more recent trend is the use of Third Party Applications (TPAs) that offer such expanded services in a telecommunications network. For example, a TPA may offer an enterprise's employees a directory of telephone numbers that can be accessed from a cell phone on a telecommunications network. This TPA may be enriched with new capabilities such as being able to whether employees are currently available (presence) and whether they are in the same vicinity (location).

A concern about such TPAs, however, is access, and in particular, privacy. That is, there is a concern about which TPAs are authorized to access a particular user, execute services on their behalf, and how to protect information in that TPA from users who are authorized to access the TPA, but who are not authorized to access some of the more sensitive/private data or services that populates the TPA.

SUMMARY OF THE INVENTION

The present invention recognizes the need to control which TPAs access a user, perform services on behalf of users and at what level of access. Thus, a method and system are presented that controls which TPAs may access a user on a telecommunications network, and defines a level of access for each user to protect the privacy of data that populates the TPA. By exercising such control, a management function can control which TPA can execute which service offered by that TPA, and can control which device (preferably a mobile device such as a cell phone) can use the TPA.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 1a-b depict an overview of a telecommunications system in which the present invention may be utilized;

DETAILED DESCRIPTION OF THE PREFERRED EMBODIMENT

With reference now to the figures, and in particular to FIG. 1a, an overview of a telecommunications system 100 is depicted. In a high-level overview, telecommunications system 100 includes a Telecom Service Provider (TSP) 102, which includes a Service Delivery Platform (SDP) 104 that is owned by a TSP owner 106. TSP 102 also includes a Third Party Enterprise (TPE) 103, which is an enterprise that may provide Third Party Applications (TPAs) to TSP 106, and preferably is able to autonomously control (independently of TSP 102) which mobile devices (MDNs described below) from a customer 108 are authorized to access particular TPAs. SDP 104 includes all hardware and software required to provide telecommunication service to customer 108, through any type of medium (land-line, wireless) using any type of resources. In a preferred embodiment of the present invention, however, the service provided by TSP 102 is wireless cellular phone service.

Figure 1B:
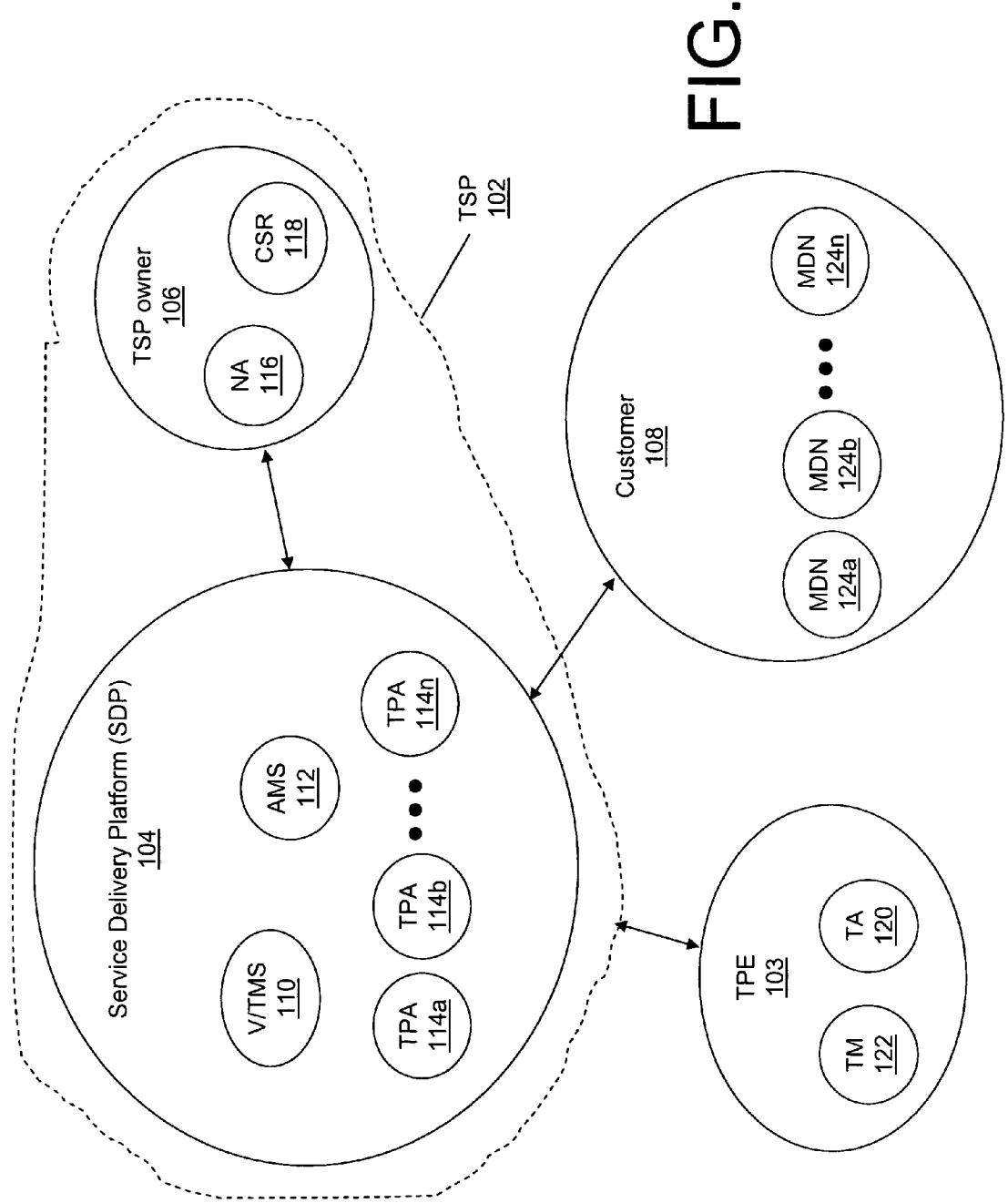

Referring now to FIG. 1b, additional detail is shown for TSP 102, TPE 103, and customer 108.

As noted in FIG. 1a, TSP 102 includes SDP 104 and TSP owner 106. SDP 104 includes a Voice/Text Message Service (V/TMS) 110, an Access Management System (AMS) 112, and one or more Third Party Applications (TPA) 114, which may or may not be interrelated (interdependent, cross-communicating, etc.). TPA 114 is a third party software application (preferably provided by TPE 103) that has been certified, preferably by TSP owner 106, for use on the resources of TSP 102, including SDP 104. There are three types of TPAs: Public, Corporate and Private. A public TPA is viewable to anyone who is logged into the SDP 104. A corporate TPA is viewable by any AMS 112 user (e.g., Mobile Device Number—MDN 124) in a same domain as that TPA 114. Private TPAs are only viewable by a Telecom Administrator (TA) 120 or Telecom Manager (TM) 122, in TPE 103, which has been assigned to manage the TPA.

MDN 124 (of which there are many as part of customer 108) is an identifier of a physical device, such as a cellular phone. Depending on a liability type of a billing account they are associated with, there are three types of MDNs 124: Corporate Liable, Employee Node, and Individual Liable. Corporate Liable MDNs are attached to a corporately liable account, such that a user of the physical device does not actually receive a bill for using the TPA and TSP; rather the bill is paid by the user's employer (e.g., customer 108). Employee Node MDNs are attached to an individually liable account, and hence the user receives and pays the bill. However, the individually liable account is attached to a Corporate Node in the billing system, thus enabling the user to receive a discount. Individual Liable MDNs are attached to an individually liable account, wherein a normal consumer account is set up and the end user receives and pays the bill.

V/TMS 110 is a service that allows text messages and voice mail to be sent to and from cellular phones.

AMS 112 is an e-business initiative that allows TSP owner 106 to manage the TPAs 114 in the SDP 104, as well as to manage MDNs 124 via a portal to the SDP 104. Note that in a preferred embodiment, TPAs 114 are provided by an enterprise other than the TSP owner 106. Thus, TPAs 114 may be provided to the SDP 104 (preferably) by TPE 103, or alternatively by customer 108 or any other third party (or third party vendor). AMS 112 uses a World Wide Web (WWW) website as a primary access channel for hosting the TPAs 114. AMS 112 also has the ability to send text messages to MDNs 124 using V/TMS 110. Alternatively, AMS 112 can send a voice message to MDNs 124 using V/TMS 110. The text/voice message can be used to invite one or more MDNs 124 to become a subscriber to one or more TPA 114 services. For example, company 108, a customer of TSP 102, could use AMS 112 to invite all of company 108's employees (located on specific MDNs 124) to subscribe to an employee directory application. Employees of customer 108 would receive a voice/text message on their cell phones asking if they would like to accept or reject this subscription invitation. The process for establishing such corporate subscriptions may be initiated by either the MDN 124 though an MDN manager such as Telecom Administrator (TA) 120 or Telecom Manager (TM) 122. Alternatively, the corporate subscription is initiated by a TPA manager such as Network Administrator (NA) 116.

The entity that owns and has primary control over TSP 102 is TSP owner 106, whose employees include at least one Network Administrator (NA) 116 and a staff of Customer Service Representatives (CSR) 118.

NA 116 is an employee, of TSP owner 106, who has full administrative rights throughout the SDP 104 environment, thus giving NA 116 the ability to provision domains and TPAs 114. NA 116 has super-user privileges to create, read and update domains. A Domain, also known as an Administrative Domain, defines the scope of Mobile Device Numbers (MDNs) and TPAs that a customer's Telecom Administrator (TA) administers. The domain is defined as one or more Billing Nodes from the TSP 102 and includes all MDNs and TPAs attached to the Billing Accounts associated with the Billing Nodes or below them in the billing system hierarchy. Preferably, domains have at least two TAs from a single customer. A Domain includes Domain Details such as the Domain ID, Domain Description, date last modified, who (first and last name) last modified it etc. Domain can also include a list of associated TAs for that domain, along with their telephone numbers. Domain can also list associated billing accounts for the domain, including billing account numbers and billing account names.

Customer Service Representative (CSR) 118 is an employee, of the TSP owner 106, who has full read rights throughout the SDP 104 environment, and uses AMS 112 to support customer 108.

Reference is now made to Third Party Enterprise (TPE) 103, which includes a Telecom Administrator (TA) 120 and a Telecom Manager (TM) 122.

TA 120 is an employee of TPE 103. TA 120 has full administrative rights throughout a single domain. TA 120 uses SDP 104 to administer V/TMS 122, TPAs 114, and MDNs 124 for the benefit of an entity such as customer 108. TA 120 has a domain assigned to him/her by NA 116, and has the ability to manage both an individual MDN 124 as well as MDN groups. TA 120 also has the ability to mange TPAs 114, and to invite MDNs 124 to subscribe to a specific TPA 114 within the context of that TPA's rules.

TM 122 is a representative from TPE 103, which has one or more TPAs 114 offered to or installed on SDP 104. TM 122 has limited administrative rights, known as managerial rights, within a single domain. TM 122 uses AMS 112 to manage TPAs and/or Corporate Liable or Employee Node MDNs that have been assigned to him/her by TA 120. TM 122 has jurisdiction over a subset of billing accounts, or groups within a billing account, within a Domain as assigned by TA 120. TM 122 has the ability to update his own user profile, as well as manage MDNs 124 and MDN groups of customer 108, manage TPAs 114, and invite MDNs 124 to subscribe to a particular one or more TPAs 114 within the context of their Domain.

Figure 2:
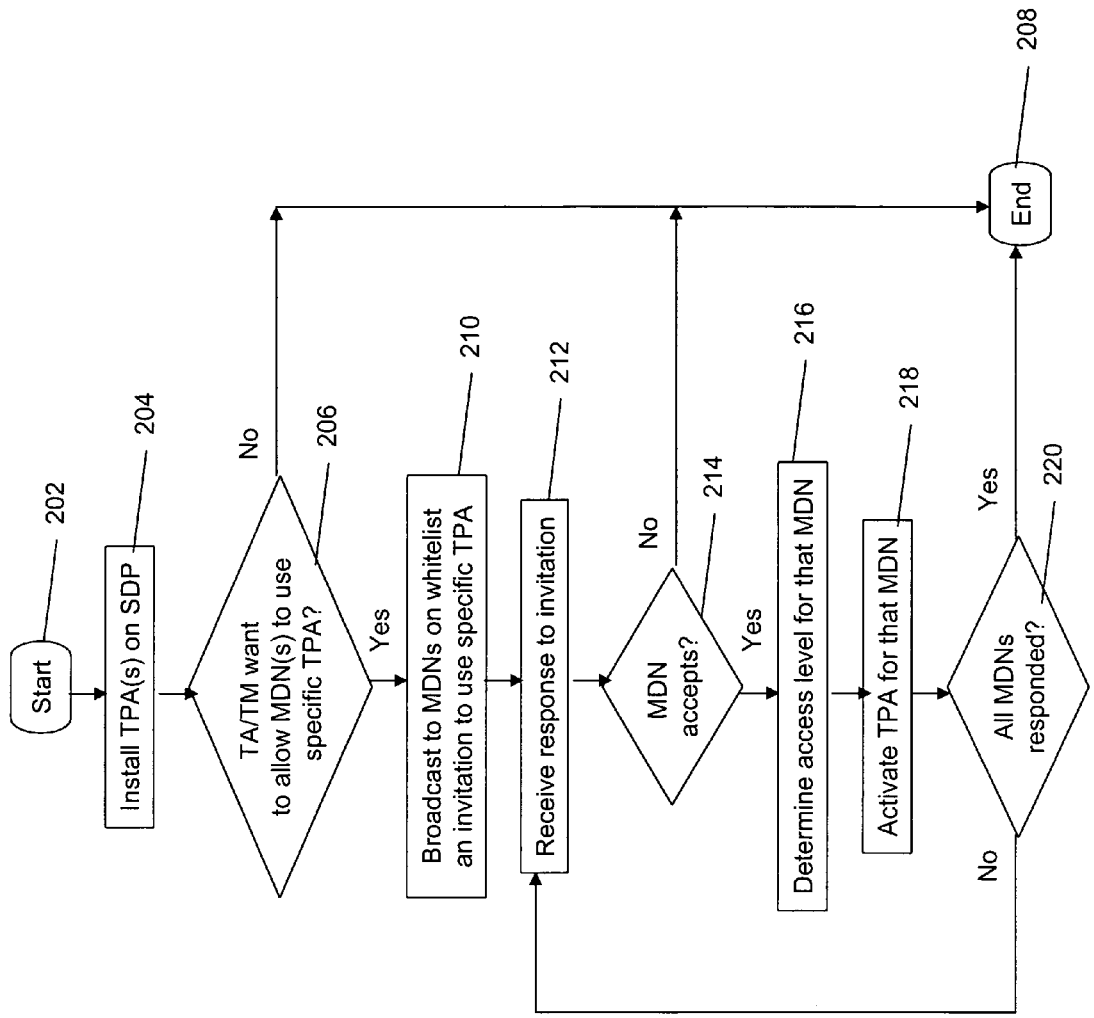
FIG. 2 is a flow-chart providing a high-level overview of steps taken in a preferred embodiment of the present invention.

Referring now to FIG. 2, a flow-chart is shown providing a high-level overview of the present invention. After initiator block 202, TPA's are installed on an SDP (block 204). These TPA's may be any type of enhancement feature to cellular service provided by the SDP, and include, but are not limited to, enterprise database access programs (including employee directories showing employee home and work telephone numbers and addresses), games, news services, Instant Messenger (IM) services (including IM broadcasting to multiple MDNs), Text Message services (including text message broadcasting to multiple MDNs), and web browser services.

At query block 206, a query is made to determine if the customer's TA or TM wants to allow multiple MDNs in the customer's enterprise (or other defined group/domain) to use/access a particular TPA. If not the process ends (terminator block 208). Otherwise, an invitation is broadcast (block 210), preferably in the form of a text message, to all authorized (on a "whitelist") MDNs in the customer's enterprise (or other defined group/domain) to utilize a particular TPA (preferably at an access level defined according to each user profile for each MDN). As shown in block 212, responses to the invitation are received (by the enterprise customer's TA and/or TM, or the network owner's NA). If the MDN declines (query block 214), the process ends (terminator block 208). Otherwise, the access level to which the MDN is authorized is determined (block 216), and the TPA is activated for that MDN at the appropriate privacy/access level (block 218). After query block 220, n which all MDNs have responded (or an appropriate time-out period expires), the process end (terminator block 208).

Figure 3A:
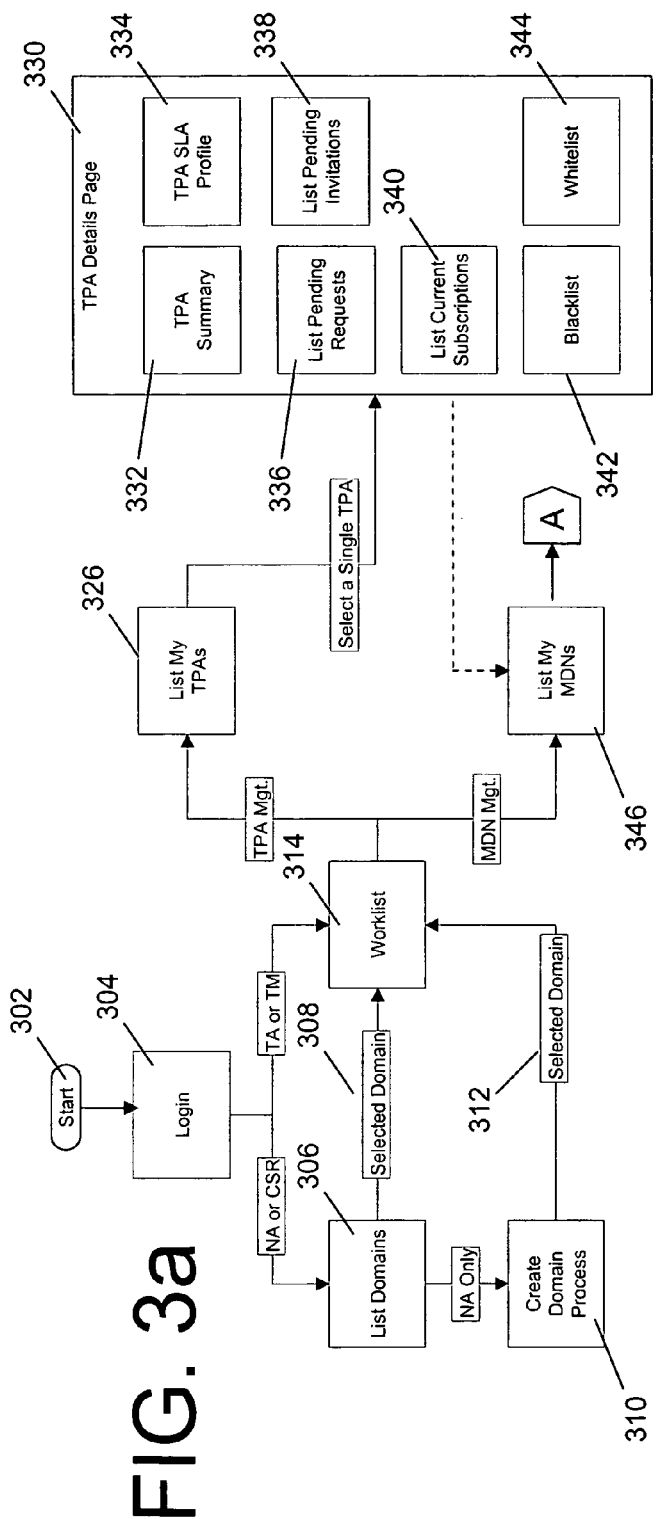
FIGS. 3a-c illustrate additional details of steps taken in a preferred embodiment of the present invention.
Figure 3C:
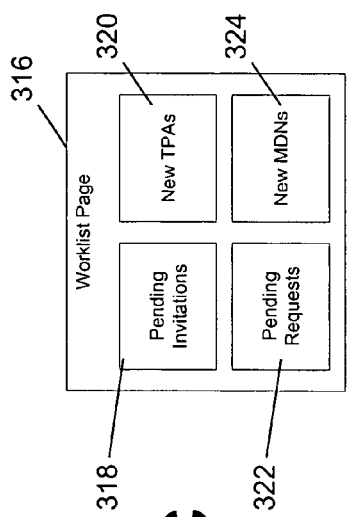
Figure 3B:
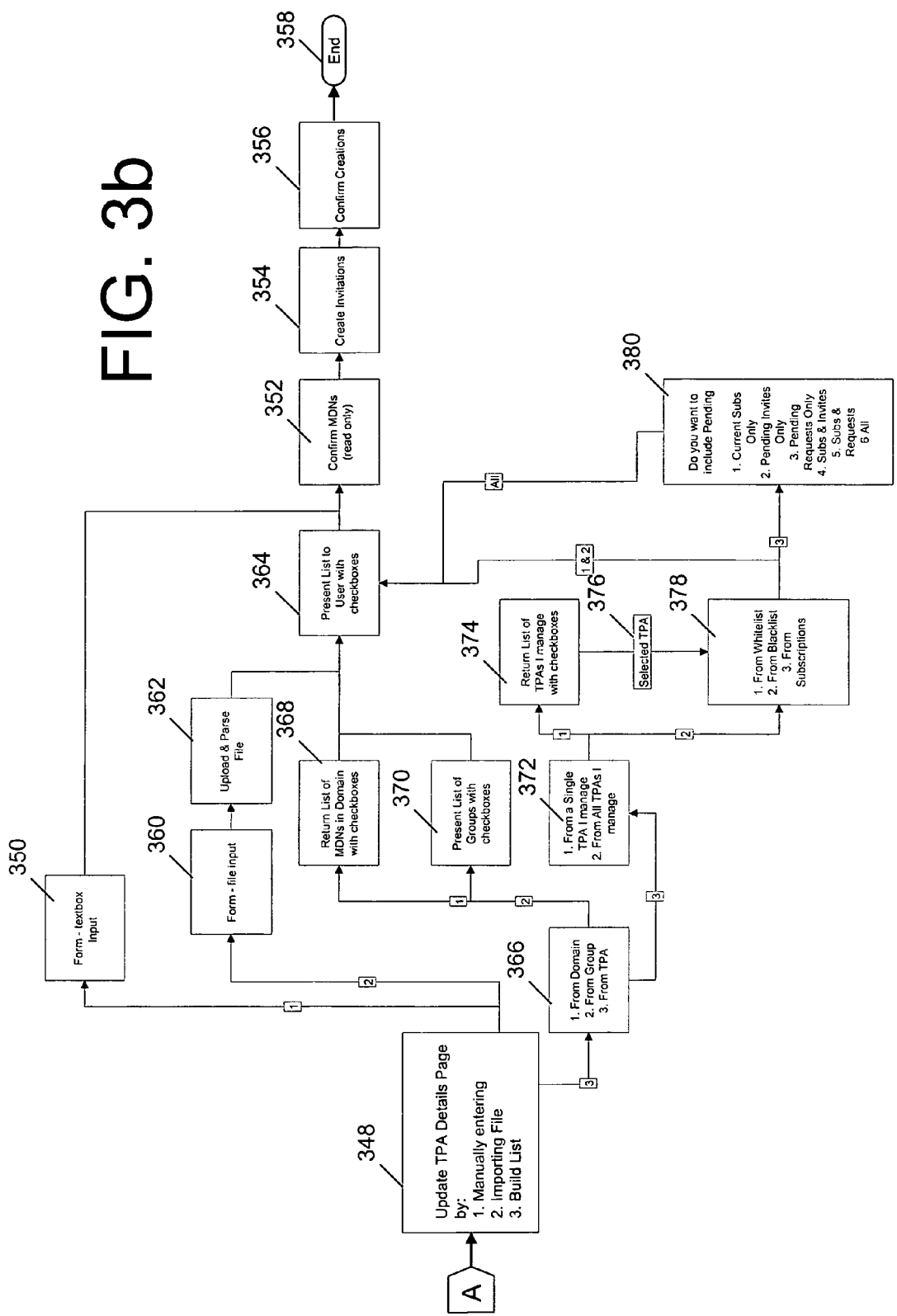

Referring now to FIGS. 3a-c, there is depicted a diagram showing additional detail of steps taken in a preferred embodiment of the present invention. After initiator block 302, the customer's TA/TM or the TSP's NA/CSR logs into the SDP (block 304). If the person logging in is a NA or CSR, then all domains are listed (block 306), and specific domains are selected (block 308). Alternatively, if the person logging in is an NA and the domain has not already been created, then domains are created (block 310) and one or more are selected (block 312).

If the person logging in is a TA or TM (or if the NA or CSR has selected a domain), then a worklist is called up (block 314). Detail of a worklist page 316 called at block 314 is shown in FIG. 3c. Included in the worklist page 316 is a list 318 of all pending invitations to MDNs to subscribe to one or more TPAs, a list 320 of all TPAs available (including new TPAs), a list 322 of all pending requests from MDNs to subscribe to one or more TPAs, and a list 324 of MDNs, including new MDNs that have recently been added to the system.

Referring again to FIG. 3a, TPA management (e.g., TA 120, TM 122, NA 116) accesses (block 326) a list of all TPAs available in worklist page 316, including those shown in list 320. A single TPA is selected (block 328), and the TPA management reviews a TPA details page 330. TPA details page 330 includes a TPA summary 332, a TPA Service Level Agreement (SLA) profile 334, a list of pending requests 336 (similar to list 322 described above), a list of pending invitations (similar to list 318 described above), a list of current subscriptions 340, a blacklist 342, and a whitelist 344.

TPA summary 332 includes, inter alia, TPA details such as the TPA ID, and TPA Name and lists of Assigned TMs, Requesting MDNs, etc. for the TPA.

TPA SLA profile 334 describes a Service Level Agreement Profile Data for a given TPA (for example, how many messages a month, service type (location).

List of current subscriptions 340 is a listing of which MDNs subscribe to the use of particular TPAs. Preferably, this list includes the level of access to which the MDN is afforded. That is, some MDNs may be able to access data that other MDNs are not permitted to access.

Whitelist 344 enables the Telecom Manager (TM) to pre-approve requests for access to a TPA(s). On adding an MDN to whitelist 344, an Invitation is not automatically sent to the MDN, unless the MDN requests access to the TPA, which will cause the request to be automatically processed by the system without the need for intervention by the TM. In addition, the TM can send an invitations to members of the whitelist later, as required. The Telecom Manager can also use whitelist 344 to automatically reject requests from MDNs that are not in whitelist 344.

Blacklist 342 also enables the Telecom Manager to automatically reject requests from an MDN. The blacklist is used to tell the Telecom Manager which MDNs do not want or are not authorized to subscribe to the TPA. That is, the MDN can blacklist TPAs just as a TPA can blacklist an MDN. If the MDN blacklists a TPA, any invitation to the MDN to subscribe to a blacklisted TPA will be automatically rejected by the MDN without the intervention of the end-user, thus effectively blocking a TPA.

Individually liability MDNs can be added to a whitelist or blacklist by the Telecom Manager if the MDN is known. This can occur within the system through a request initiated by the MDN or outside the system by the end-user providing the MDN to the Telecom Manager. In this event, the MDN is added to the list individually or by importing a list of MDNs from a text file.

Note that the most recently performed action on an MDN or TPA will always supersede previous actions. This means that:

1. In the event that a whitelisted MDN is blacklisted by a Telecom Manager, the MDN would be automatically removed from the whitelist and added to the blacklist.
2. In the event that a blacklisted MDN is whitelisted by a Telecom Manager, the MDN would be automatically removed from the blacklist and added to the whitelist.
3. In the event that a subscribed MDN is blacklisted by a Telecom Manager, the MDNs subscription would be cancelled and it would be added to the blacklist.
4. In the event that a whitelisted TPA is blacklisted by an Individual, the TPA would be automatically removed from the whitelist and added to the blacklist.
5. In the event that a blacklisted TPA is whitelisted by an Individual, the TPA would be automatically removed from the blacklist and added to the whitelist.
6. In the even that a subscribed TPA is blacklisted by an Individual, the TPA subscription would be cancelled and it would be added to the blacklist.

With further regards to whitelist 344, a Telecom Manager has the ability to pre-approve (whitelist) an MDN for a single, multiple or all TPAs that they administer. This allows the Telecom Manager to manually enter a single MDN so that it can be pre-approved. The Telecom Manager can also select single, multiple or all MDNs from a predefined named group or dynamically generated list (see lists below) so that they can be pre-approved. Furthermore, the Telecom Manager has the ability to remove a single, multiple or all MDNs from the whitelist, and to automatically remove the an MDN from the whitelist in the event that it is blacklisted.

With further regards to blacklist 342, blacklist 342 affords the Telecom Manager the ability to 1) generate a list of MDNs from MDNs that are subscribed to single, multiple or all TPAs the Telecom Manager administers; 2) generate a list of MDNs from MDNs that have been blacklisted on single, multiple or all TPAs the Telecom Manager administers; 3) generate a list of MDNs from MDNs have been pre-approved on single, multiple or all TPAs the Telecom Manager administers; 4) generate a list of MDNs from MDNs that have been invited to join single, multiple or all TPAs the Telecom Manager administers; 5) generate a list of MDNs from employee node MDNs that are associated with a root corporate node or single or multiple child nodes; 6) generate a list of MDNs from corporate liable MDNs that are associated with a root corporate node or single or multiple child nodes; 7) generate a list of MDNs from MDNs that the Telecom Manager administers; 8) generate a list of MDNs by selecting a single or multiple group(s) that have been predefined by the Telecom Manager and that contain MDNs that the Telecom Manager administers; 9) generate a list of MDNs from a comma-delimited text-file that is uploaded.; 10) save a generated list of MDNs as a group with a name defined by the Telecom Manager; and 11) invite an MDN to subscribe to a TPA that the Telecom Manager administers.

Referring again to FIG. 3a, MDN management (e.g., TM 122, TA 120), can request to view a list of current MDNs (block 346, either with of without consulting the contents of TPA details page 330). As described in FIG. 3b, the TPA details page 330 can be updated by 1) manually entering information; 2) importing a file; or 3) building a list (block 348).

Assume that TPA details page 330 is to be manually updated. If so, then inputs are entered into a form (textbox), preferably on a webpage (block 350), new (read-only) MDNs are created (block 352, invitations are created to subscribe to TPAs (block 354, if the invitations are accepted, creating of the relationship between a TPA and MDN is confirmed (block 356), and the process ends.

If TPA details page 330 is to be updated by importing files, then the imported file is used as an input (block 360) to be uploaded and parsed (block 362) to create a list (of available TPAs) available to a user (MDN) (block 364), and the process continues as described above (creating MDNs, invitations, etc.).

If the TPA details page 330 is to be updated by building a new list, the process is more complicated. First (block 366), a decision is made as to whether the list is to be built according to a 1) Domain, 2) Group, or 3) TPA. If to be built according to a Domain or Group, then a list of MDNs in the Domain must be returned (block 368) and a list of groups must be presented (block 370) to present a list of available TPAs to the (MDN) user (block 364. If to be built according to a TPA, then a decision must be made whether to update the page from a single TPA being managed or from a group of TPAs being managed (block 372). If from a single TPA, the a list of all TPAs being managed (by a particular NA, TM or TA) is returned (block 374). The selected TPAs (block 376) are then used to determine if a TPA is available according to a 1) whitelist, 2) blacklist, or 3) current subscription (block 378). If based on currently active subscription(s), then a decision is made by the manager to include in the TA details page 1) current subscriptions only, 2) pending invitations only, 3) pending requests only, 4) subscriptions and invitations only, 5) subscriptions and requests only, or 6) all of the above (block 380). The list is then presented to the user (showing TPAs being offered) as described in block 364, and the process proceed to terminator block 358 as described above.

Figure 4:
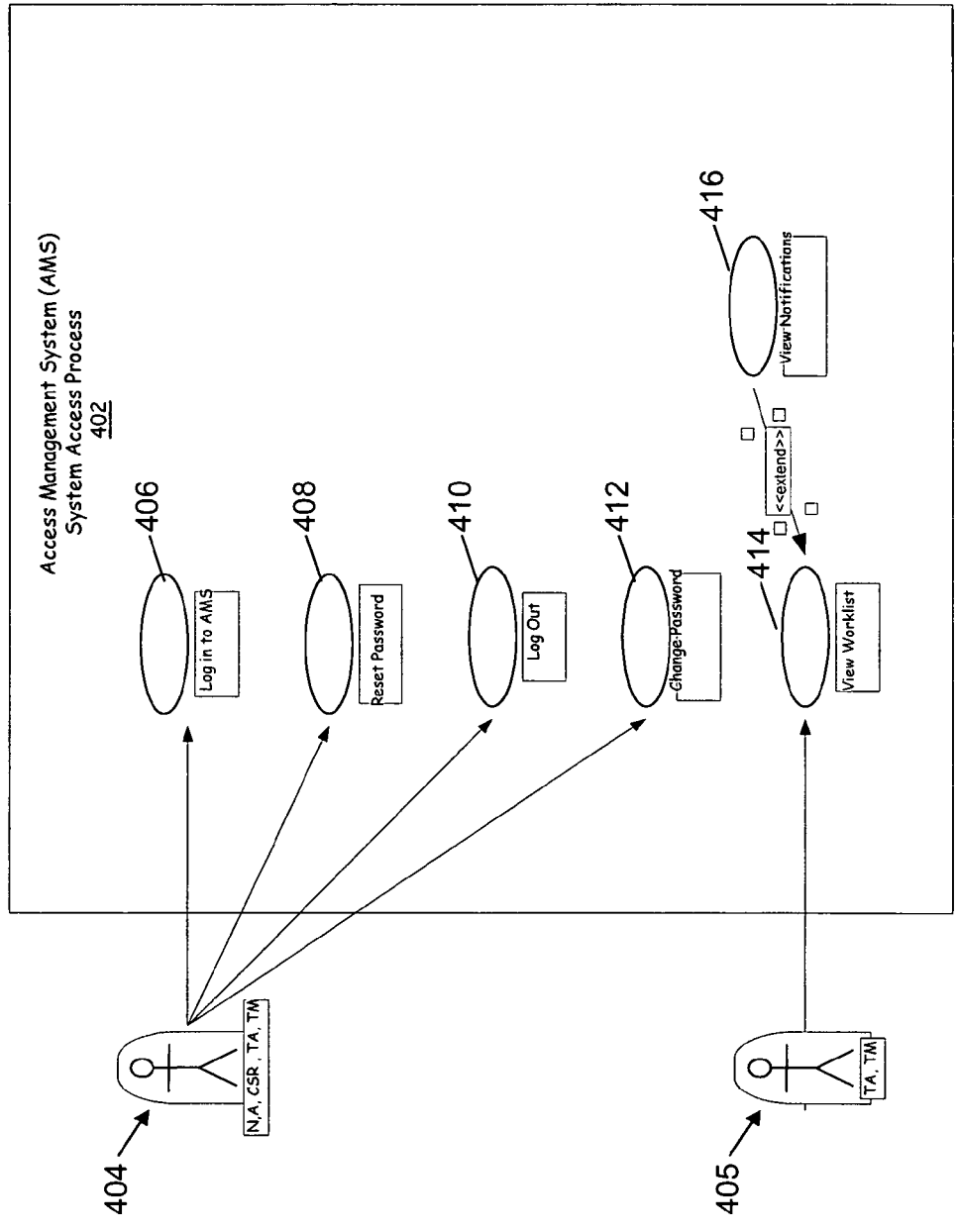
FIG. 4 depicts an Access Management System (AMS) System Access Process.

Referring now to FIG. 4, AMS System Access Process (AMSSAP) 402 is shown for Access Management System (AMS) 112. An actor 404, which may be NA 116, CSR 118, TA 120 or TM 122 is able to log into AMSSAP 402 (block 406), reset the password of the AMSSA 402 (block 408), log out of the AMSSAP 402 (block 410), change the password for the AMSSAP 402 (block 412) and/or change the password for the AMSSAP 402.

With regards to the actions in block 406, actor 404 creates and submits a Log In Request. AMS 112 validates the request, and then logs in a Log In Transaction in a local database (in AMS 112) for a specified User ID. AMS 112 then sends the request to a Consumer Data and Privacy Management (CD&PM) database, along with the specified User ID. CD&PM then returns an appropriate Worklist and Domain ID, and resents the Worklist to actor 404. AMS 112 then writes a record to an Audit Log, and the process ends. Note that CD&PM is defined as a sub-system that interfaces with AMS 112 via a defined Application Program Interface (API) to authenticate and maintain profiles for users of AMS 112. In a preferred embodiment, CD&PM send e-mails to notify users when User Profiles are created and when passwords are reset.

With regards to the actions in block 408, actor 404 creates and submits a Reset Password Request. AMS 112 validates the request and generates a corresponding request for Host (e.g., CD&PM) and sends the request to Host. Host validates the request and performs the update, and then indicates to AMS 112 that the request was completed successfully. AMS 112 then writes a record to the Audit Log, and the process ends.

With regards to the actions in block 410, actor 404 indicates that he/she wishes to log out of AMS 112. AMS 112 terminates actor 404's AMS session, and redirects actor 404 to an initializing login screen, thus ending the process.

With regards to the actions in block 412, actor 404 creates and submits a Change Password Request. AMS 112 validates the request, and generates a corresponding request to the Host (e.g., CD&PM). The Host validates the request and performs the update, and then indicates to AMS 112 that the request was completed successfully. AMS 112 then sends a message to actor 404 that the request was completed successfully, and the process ends.

Meanwhile, actor 405 (which may be TA 120 or TM 122), views the worklist (block 414), based on the steps taken in block 416 (view notifications). With regards to the operations in block 414, AMS 112 generates a Retrieve Worklist request for Host and sends it to Host. Host then validates the request and retrieves the list. Host then returns the list to AMS 112. The process is repeated for each list until AMS 112 displays list(s) to actor 405, who views the lists. With regards to block 416, after returning the list to AMS 112, block 416 takes the step of having AMS 112 insert into the worklist one Notification Worklist Item for each active notification, and the process described in block 414 then continues to completion.

Figure 5:
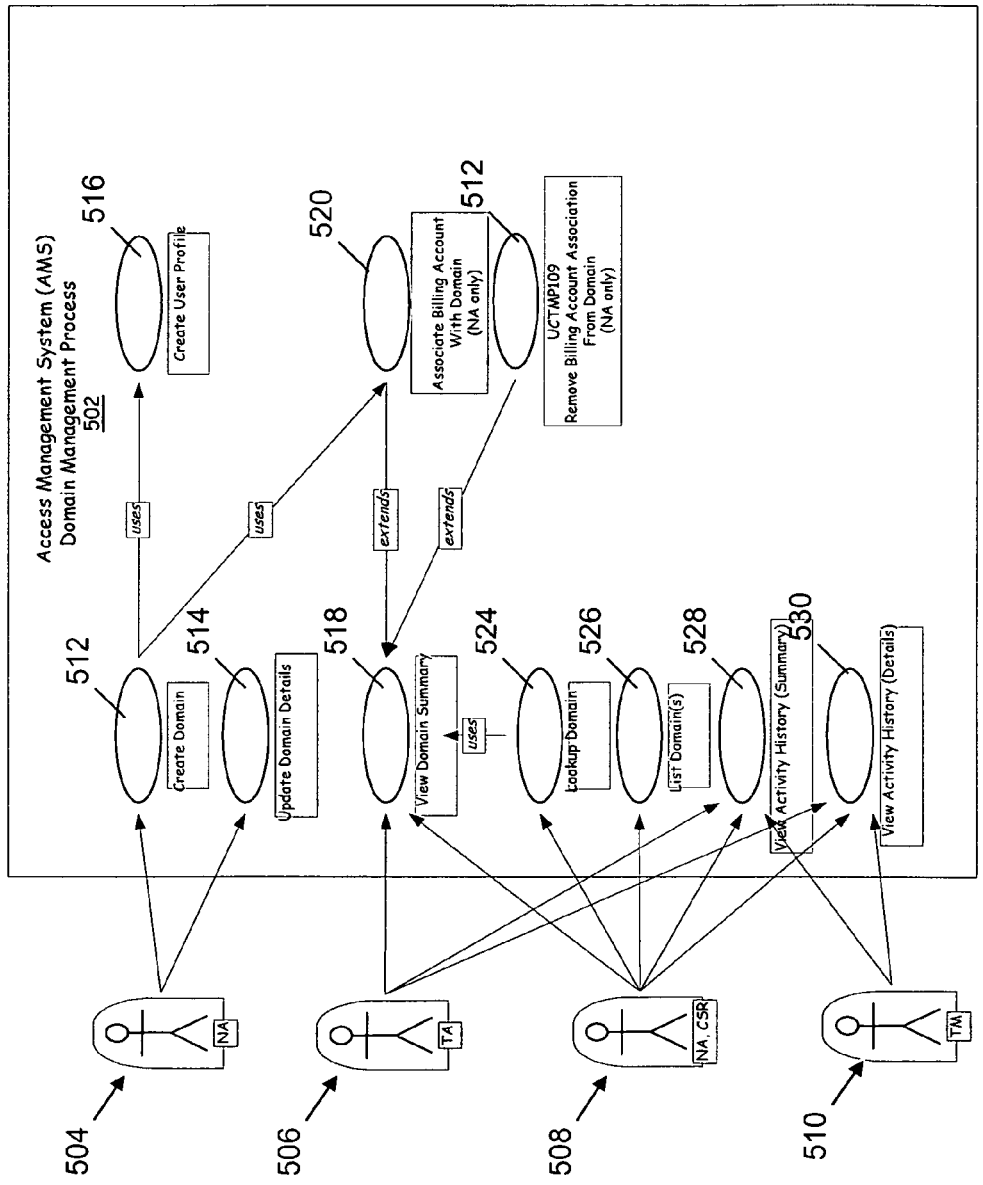
FIG. 5 illustrates an AMS Domain Management Process.

With reference now to FIG. 5, an AMS Domain Management Process (AMSDMP) 502 is depicted. (See detail above regarding Domains.) AMSDMP 502 includes the functions of creating a domain (block 512), updating domain details (block 514), creating a user profile (block 516), viewing a domain summary (block 518), associating billing information with a domain (block 520), removing billing account association from a domain (block 522), looking up a domain (block 524), listing a domain (block 526), viewing activity history (block 528), and viewing activity history (block 530).

An actor 504, which is preferably NA 116, is able to create a domain (block 512), which uses a user profile (block 516). Actor 504 is also able to update domain details.

Regarding the actions taken in block 512, actor 504 creates and submits a Domain ID Validation Request. AMS 112 validates the request, and generates and sends a corresponding request to Host (e.g., CD&PM), which validates the request and creates a Domain. Host indicates to both AMS 112 and actor 504 that the update was successful, and then writes a record to the Audit Log. If AMS 112 is unable to validate the request, then AMS 112 advises actor 504 of the problem, such that actor 504 can either correct the problem of abandon his attempt to create the Domain. Analogous error messages are sent to actor 504 if AMS 112 determines that the Host is down, or if Host determines that the request sent by AMS 112 is invalid (e.g., Domain ID already exists for the Corporate Customer). Regarding the actions taken in block 514, Actor 504 creates and submits an Update Domain Request. AMS 112 validates the request., and then AMS 112 generates a corresponding request for Host and sends it to Host. Host validates the request and performs the update. Host then indicates to AMS 112 that the request was completed successfully. AMS 112 indicates to the Actor 504 that the request was completed successfully, and then writes a record to the Audit Log.

As indicated, block 512 uses block 516. With regards to the operations in block 516, Actor 504 creates and submits a Create User Request. AMS 112 validates the request, and generates and sends a corresponding request to Host, which then validates the request and creates the profile. Host sends a message to AMS 112 and Actor 504 that the request was completed successfully, and then writes a record to the Audit Log.

Actor 506, which is preferably TA 120, is able, inter alia, to view a domain summary (block 518). In block 518, Actor 506 views a summary of information for a specified Domain. This includes Domain Details and lists of Associated Telecom Administrators and Associated Billing Accounts for the Domain.

Block 520 extends the function of block 518. In block 520, Actor 506 or Actor 508 associates a Billing Account with a specified existing Domain. This adds a relationship between the existing Domain and the specified Billing Account.

Similarly, block 522 extends the function of block 518. In block 522, Actor 506 or 508 removes a Billing Account association from a specified existing Domain. This deletes the existing relationship between the Domain and the specified Billing Account.

Besides initiating the action of block 518, Actor 508 (preferably NA 116 or CSR 118) is able to initiate blocks 524, 526, 528 and 530. In block 524, Actor 508 enters a specific full Domain ID to view the Domain summary information. AMS-DMP 502 returns the corresponding Domain record that matches the unique Domain ID entered by the user, using a View Domain Summary. In block 526, Actor 508 views a list of all Domains in the SDP 104 environment based on User ID and selects one Domain to work with. In block 528, Actor 508 (and/or Actors 506 and 510) views an audit trail of activity that has taken place in the Domain by both external corporate and internal users of TSP 102. This includes last successful log in time and date. This is a summary of activity history for all users in the domain. In block 530, Actor 508 (and/or Actors 506 and 510) views an audit trail of activity that has taken place in the Domain by a single external corporate or internal TSP 102 user. This includes last successful log in time and date. Note that Actor 510 is preferably TM 122.

Figure 6:
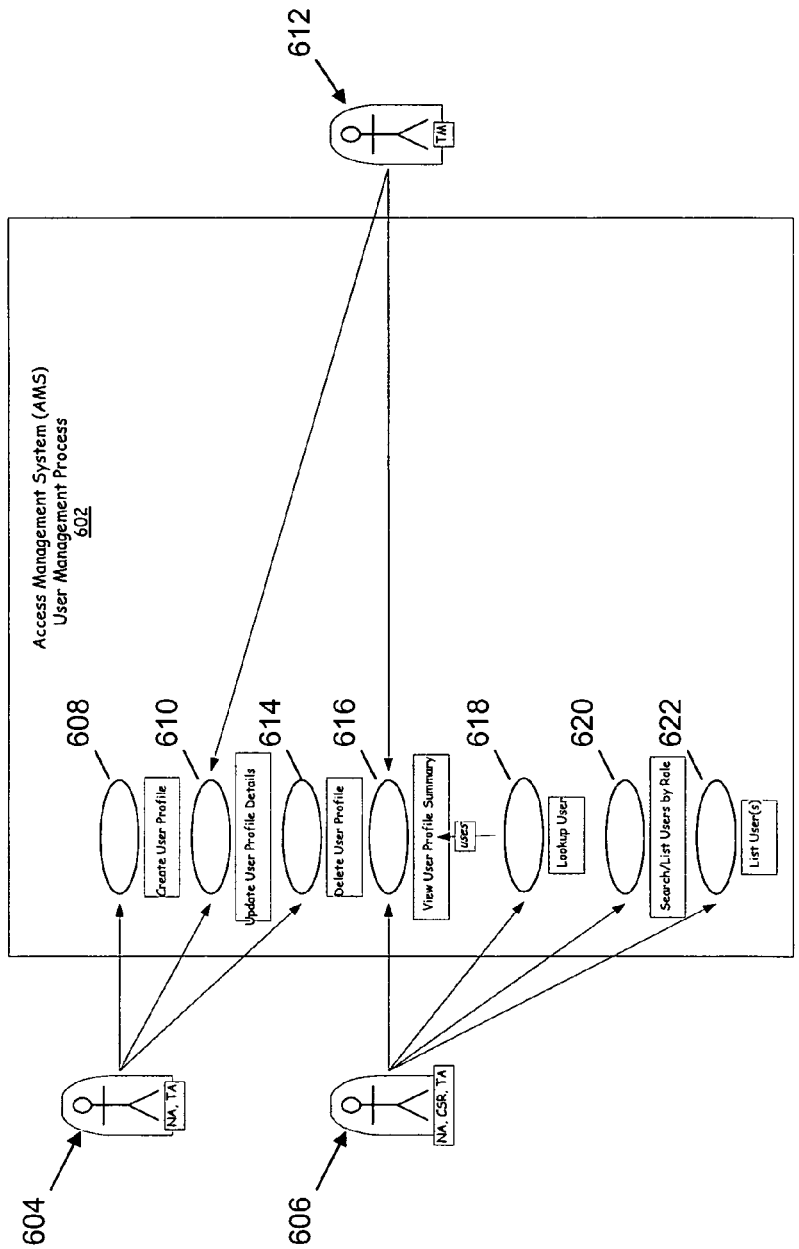
FIG. 6 depicts an AMS User Management Process.

Referring now to FIG. 6, an AMS User Management Process (AMSUMP) 602 is depicted, which includes creating a user profile (block 608), updating a user profile details (block 610), deleting a user profile (block 614), viewing a user profile summary (block 616), looking up a user (block 618), searching/listing users by role (block 620), and listing users (block 622).

In block 608, an actor 604, preferably NA 116, creates a new profile for a User and assigns a User Role. In block 610, actor 604 (or Actor 612, who is preferably TM 122), Actor 604 updates details for a specified User Profile. In addition, Actor 604 (and only Actor 604), can change the assigned User Role. In block 614, Actor 604 deletes a specified User Profile.

In block 616, an Actor 606 (NA 116, CSR 118, or TA 120), or Actor 612, views a summary of information for a specified user profile. This includes User Profile Details and lists of associated TPAs, associated AMSs and associated Groups for the User Profile.

In block 618, Actor 606 enters a specific full User ID to view the User Profile summary information. AMSUMP 602 returns the corresponding User Profile record that matches the unique User ID entered by the user, using a View User Profile Summary.

In block 620, Actor 606 searches for an AMS User profile to work with by specified a Role across all Domains or within a specified Domain. AMSUMP 602 returns a list of Users in the AMS environment for the specified Role.

In block 622, Actor 606 views a list of AMS Users based on User ID and selects one User to work with.

Figure 7:
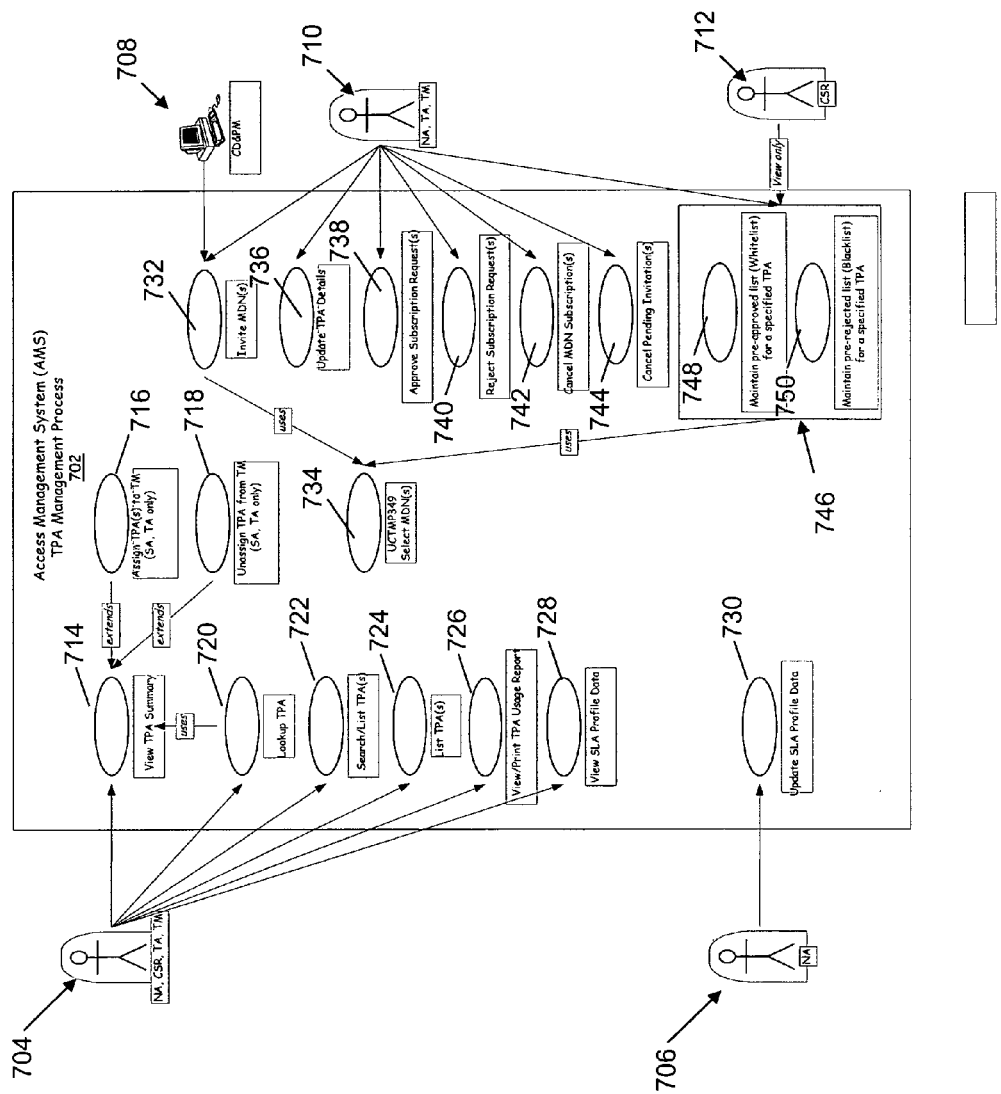
FIG. 7 illustrates an AMS Third Party Application (TPA) Management Process.

With reference now to FIG. 7, an AMS TPA Management Process (ATMP) 702 is depicted. ATMP 702 is utilized by Actor 704 (NA 116, CSR 118, TA 120, or TM 122), Actor 706 (NA 116), CD&PM 708 (see details above regarding CD&PM), Actor 710 (NA 116, TA 120, or TM 122), and Actor 712 (CSR 118).

ATMP 702 includes viewing TPA summary (block 714), assigning TPA(s) to a TM (block 716—performed only by NA 116 or TA 120), unassigning a TPA from the TM (block 718—performed only by NA 116 or TA 120), looking up a TPA (block 720), searching/listing TPA(s) (block 722), listing TPA(s) (block 724), viewing/printing usage reports (block 726), viewing Service Level Agreement (SLA) profile data (block 728), updating SLA profile data (block 730), inviting MDN(s) to subscribe to a TPA (block 732), updating TPA details (block 736), approving subscription requests (block 738), rejecting subscription requests (block 740), canceling MDN subscriptions (block 742), canceling pending invitations (block 744), MDN lists 746, which are based on maintaining pre-approved whitelists for specific TPA(s) (block 748) or a pre-rejected blacklist for specific TPA(s) (block 750).

Regarding block 714, Actor 704 views summary information for a given TPA, this includes TPA Details such as the TPA ID, and TPA Name and lists of Assigned Telecom Managers, Requesting MDNs, etc. for the TPA.

In block 716, Actor 704 (NA 116 or TA 120 only) assigns one or more active TPAs to one Telecom Manager.

In block 718, Actor 704 (NA 116 or TA 120 only) unassigns one TPA from one Telecom Manager.

In block 720, Actor 704 enters a specific TPA ID to view the TPA summary information. ATMS 702 returns the corresponding TPA Summary to Actor 704 using a View TPA Summary.

In block 722, Actor 704 searches for a list of TPA(s) by entering specified search criteria to filter the list of TPAs.

In block 724, Actor 704 views a list of TPAs based on User ID and selects one or several TPAs to work with. Preferably, block 722 is an alternate block if block 724 is not used.

In block 726, Actor 704 views transaction data on an adhoc basis for a given TPA for a specified period of time. Actor 704 can also sort, print or download the report.

In block 728, Actor 704 views the Service Level Agreement Profile Data for a given TPA (for example, how many messages a month, service type (location).

In block 730, Actor 706 updates Service Level Agreement Profile Data for a TPA.

In block 732, Actor 710 invites one or several MDNs to subscribe to one active TPA that he manages. CD&PM 708 is accessed to determine what privacy level an invited mobile device (MDN) is authorized to have. For example, CD&PM 708 may show that a particular MDN is authorized to have a specific TPA display work telephone numbers from co-workers in his enterprise, but NOT their home telephone numbers. AMS 112 sends invitations to MDN owners using V/TMS 110 in real-time.

In block 734, a selection is made of one or several MDNs to be considered when inviting MDN(s) to use a TPA, to maintain a pre-approved list (Whitelist) for a specified TPA, and to maintain a pre-rejected list (Blacklist) for a specified TPA.

In block 736, CD&PM 708 and/or Actor 710 updates details for a specified TPA, such as the TPA Type.

In block 738, Actor 710 approves one or several pending subscription requests for one TPA.

In block 740, Actor 710 rejects one or several pending requests for one TPA.

In block 742, Actor 710 cancels one or several MDN Subscriptions to a specific TPA. Such cancellations may be at the MDN's request, for non-payment of a bill for the subscription, or in response to the specific TPA expiring (exceeding a lifetime of the TPA).

In block 744, Actor 710 cancels one or several pending invitations for one TPA. Note that the invitations may be cancelled automatically after a pre-determined period of time, or in response to a request from TPE 103, customer 108, or TSP owner 106.

In block 748, Actor 710 and/or Actor 712 views a pre-approved list (Whitelist) and optionally pre-approves (Whitelists) one or several MDNs for a specified TPA they administer, or removes one or several MDNs from a TPA Whitelist.

In block 750, Actors 710 and/or 712 views a pre-reject list (Blacklist) and optionally pre-rejects (Blacklists) one or several MDNs for a specified TPA they administer, or removes one or several MDNs from a TPA Blacklist.

Figure 8:
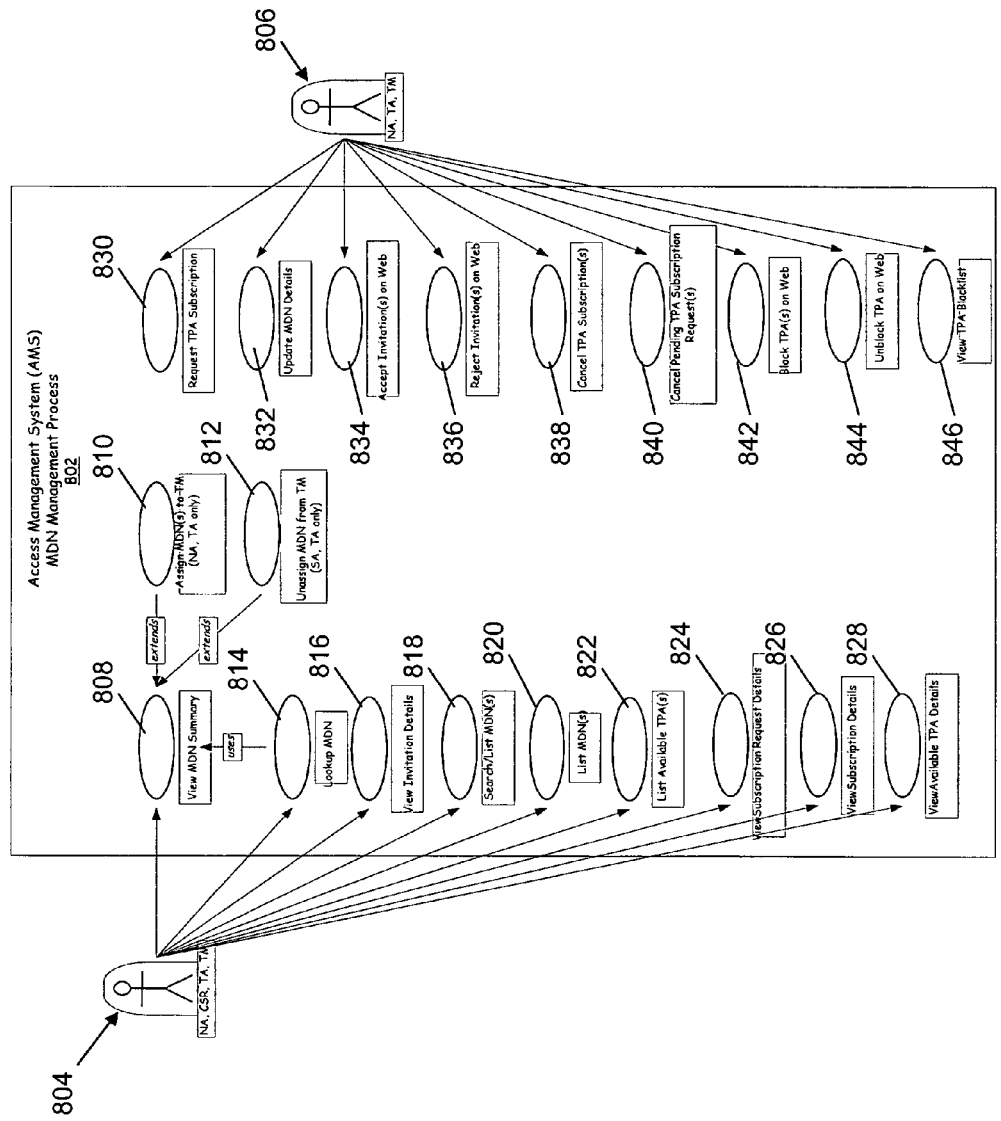
FIG. 8 depicts an AMS Mobile Device Number (MDN) Management Process.

With reference now to FIG. 8, an AMS MDN Management Process (AMMP) 802 is depicted. AMMP 802 allows Actor 804 (NA 116, CSR 118, TA 120 and/or TM 122) to view MDN summary (block 808), assign MDN(s) to a TM (block 810), unassign MDN(s) from the TM (block 812), lookup MDN (block 814), view invitations details (block 816), search/list MDN(s) (block 818), list MDNs (block 820), list available TPA(s) (block 822), view subscription request details (block 824), view subscription details (block 826), and/or view available TPA details (block 828). AMMP 802 also allows Actor 806 (NA 116, TA 120, and/or TM 122) to request a TPA subscription (block 830), update MDN details (block 832), accept invitations over the Web to subscribe to an TPA (block 834), rejection invitations (block 836), cancel TPA subscriptions (block 838), cancel pending TPA subscription request(s) (block 840), block TPA(s) over the Web (block 842), unblock TPA(s) over the Web (block 844), and/or view a TPA blacklist (block 846).

In block 808, Actor 804 views summary information for a specified MDN. This includes MDN Details such as MDN, and MDN Name and lists of Associated Groups, Assigned Telecom Managers, and TPA Invites, etc. for the MDN.

In block 810, Actor 804 (only NA 116 or TA 120) assigns one or more MDNs to one Telecom Manager.

In block 812, Actor 804 (only NA 116 or TA 120) unassigns one MDN from one Telecom Manager.

In block 814, Actor 804 enters a specific MDN to view the MDN summary information. AMMP 802 returns the corresponding MDN record that matches the unique ID entered by the user, using a View MDN Summary.

In block 816, Actor 804 views TPA details for a specified Invitation including TPA Terms and Conditions.

In block 818, Actor 804 can search, filter (perform a refined search within a returned search list) and sort MDNs retrieved from CD&PM by specified attributes, or a combination of the attributes (advanced search). AMMP 802 returns a list of all MDNs in the SDP 104 environment that match the search criteria.

In block 820, Actor 804 views a list of MDNs based on User ID and selects one or several MDNs to work with.

In block 822, Actor 804 views a list of available Active TPAs based on a User ID.

In block 824, Actor 804 views TPA details for a specified Subscription Request.

In block 826, Actor 804 views TPA details for a specified Subscription. Note that the details for a subscription preferably include a TPA ID, TPA User Friendly Name, TPA Description, TPA Type, BMP Services, TPA Status, TPA Service URL (if available), and TPA Help Desk Phone Number (optional).

In block 828, Actor 804 views details for an available TPA. Details of an available TPA include a TPA ID, TPA User Friendly Name, TPA Description, TPA Type, BMP Services, TPA Status, TPA Service URL (if available) and TPA Help Desk Phone Number.

In block 830, Actor 806 requests to subscribe to one TPA for one or more MDN(s) that he manages. This is a multi step process that includes: 1) Listing selected MDNs (the ones that were selected from List MDNs), MDN User Display Name, Liability Type; 2) Selecting one TPA to subscribe—showing TPA ID, TPA User Friendly Name, Domain Match Indicator, TPA Type; 3) Verifying a list of selected MDN(s) and details of a selected TPA.

In block 832, Actor 806 updates details for a specified MDN such as MDN User Display Name and V/TMS 110 Notification of Invitation Options.

In block 834, Actor 806 can accept invitations to subscribe to one or more TPAs for one or more MDNs via the Web.

In block 836, Actor 806 rejects invitations to subscribe to one or more TPAs for one or more MDNs via the Web. Actor 806 optionally adds TPA(s) to a block list (blacklist).

In block 838, Actor 806 cancels one or several TPA Subscriptions for a given MDN. Actor 806 may also add the TPA(s) to the Block list (blacklist).

In block 840, Actor 806 cancels one or several pending TPA Subscription requests for a given MDN. Actor 806 may optionally add TPA(s) to a Block List (blacklist).

In block 842, Actor 806 blocks a TPA for one or more MDN(s) via the Web.

In block 844, Actor 806 unblocks a TPA for a specified MDN via the Web. This removes the TPA from the blacklist.

In block 846, Actor 806 views a TPA Blacklist (blacklist) for a specified MDN.

Figure 9:
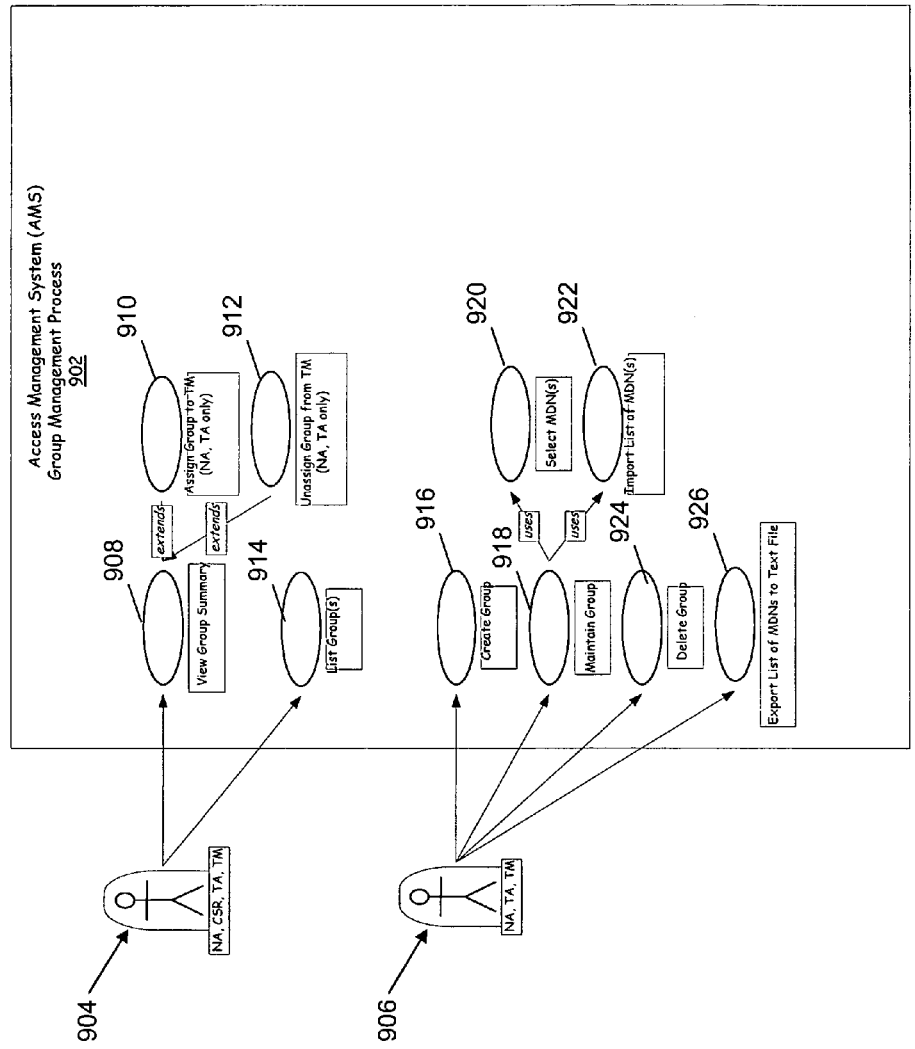
FIG. 9 illustrates an AMS Group Management Process.

Referring now to FIG. 9, an AMS Group Management Process (AGMP) 902 is depicted. AGMP 902 includes the ability to view group summaries (block 908), assign a group to a TM (block 910), list groups (block 914), unassign a group from a TM (block 912), create a group (block 916), maintain a group (block 918), select MDNs (block 920) and import lists of MDN(s) (block 922) that block 918 uses, delete groups (block 924), and export lists of MDNs to text files (block 926).

In block 908, an Actor 904 (NA 116, CSR 118, TA 120 and/or TM 122) views a Group Summary (details and associated lists) for a single Group. Note that a group is defined as a group of MDNs. Details describing a group include a Domain ID, Group Name, Last Modified Date, and who last modified a group's definition. The group is further defined by a list of Assigned TMs for the Group, and the liability type of the MDNs in the group.

In block 910, Actor 904 assigns one Group to one Telecom Manager. Note that only NA 116 and TA 120 are authorized to perform this step.

In block 912, Actor 904 (again only NA 116 and/or TA 120) unassigns one Group from one Telecom Manager.

In block 914, Actor 904 views a list of Groups based on User ID. Actor 904 selects one Group to work with.

In block 916, Actor 906 (NA 116, TA 120, and/or TM 122) creates a group and/or group name. Note that if TM 122 creates a group, TM 122 is by default the manager (Host) of that group.

In block 918, Actor 906 adds or removes one or more MDNs to or from the Group they Manage. Note that TA 120s have managerial (host) rights over all Groups in their Domain, while NA 116's have managerial (host) rights over all Groups.

In block 920, Actor 906 elects one or several MDNs to be used when inviting MDN's to subscribe to TPA(s), maintain a pre-approved list (Whitelist) for a specified TPA, and maintain a pre-rejected list (Blacklist) for a specified TPA.

In block 922, Actor 906 imports a list of MDN(s) from an external file.

In block 924, Actor 906 deletes a Group, and the Group Name is removed and MDN(s) relationship to Group is deleted.

In block 926, Actor 906 exports a list of MDN(s) to a Text File, which is external to TSP 102 and thus easier to access.

Figure 10:
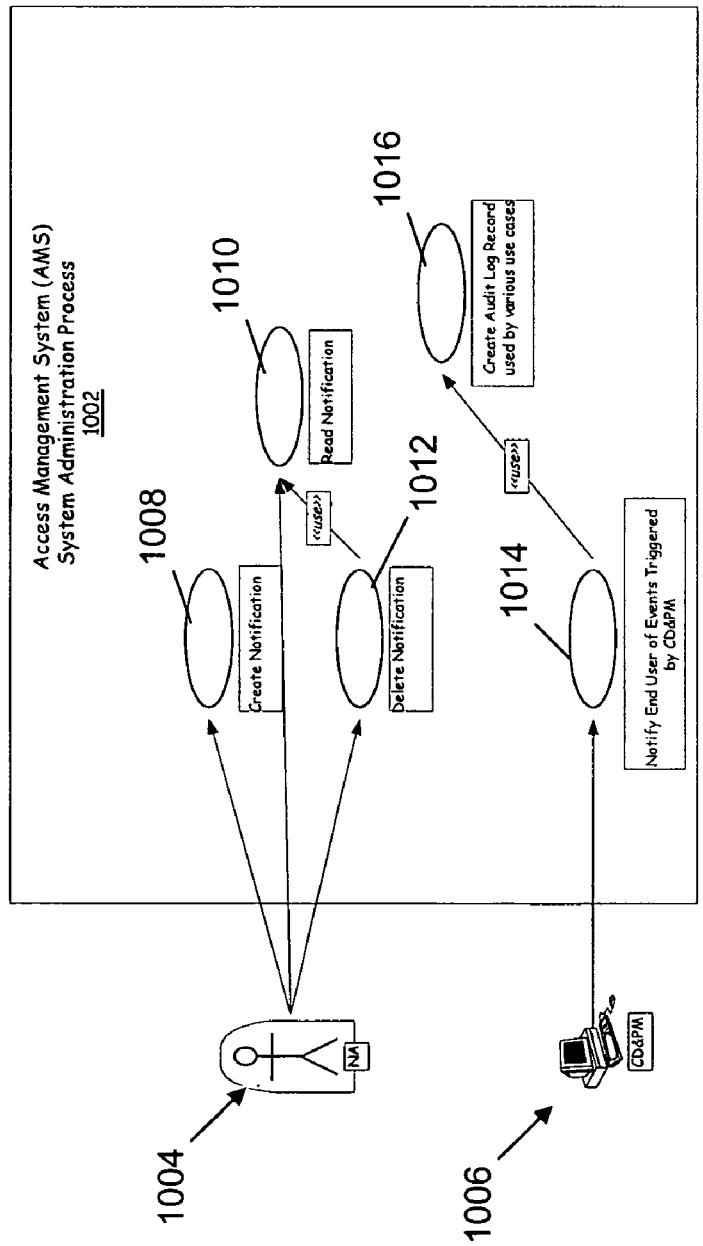
FIG. 10 depicts an AMS System Administration Process.

With reference now to FIG. 10, an AMS System Administration Process (ASAP) 1002 is depicted. ASAP 1002 includes the ability to create a notification of an invitation to subscribe to a TPA (block 1008), read the notification (block 1010), and delete the notification (block 1012). ASAP 1002 also includes the ability to notify an end user of events triggered by CD&PM (block 1014) and to create an audit log record used by the system (block 1016).

In block 1008, an Actor 1004 (NA 116) creates a notification that will be displayed to other AMS 112 users to notify them about events such as scheduled and unscheduled outages and other general information. The notification includes a title, body, effective date and expiration date.

In block 1010, Actor 1004 views the information for an existing notification.

In block 1012, Actor 1004 deletes an existing notification that is no longer required.

In block 1014, AMS 112 sends notification(s) to an end user following an event triggered by Consumer Data and Privacy Management database (CD&PM) 1006. Such events include the situation in which a TPA, which an MDN is subscribed to, has had a new API family added to it when the MDN is either liable or in employee mode; when a corporate liable MDN has been systematically opted-in to a TPA that is under a same Admin Domain Account ID; a TPA that a MDN is subscribed to has changed billing accounts through a transfer of liability; an MDN has been subscribed to a TPA, an MDN has been unsubscribed to a TPA; and/or a TPA that users have managerial rights over has changed billing accounts through a transfer of liability.

In block 1016, AMS 112 creates an audit log record of AMS user activity (for any action on an entity and any relationship change between 2 entities).

Figure 11:
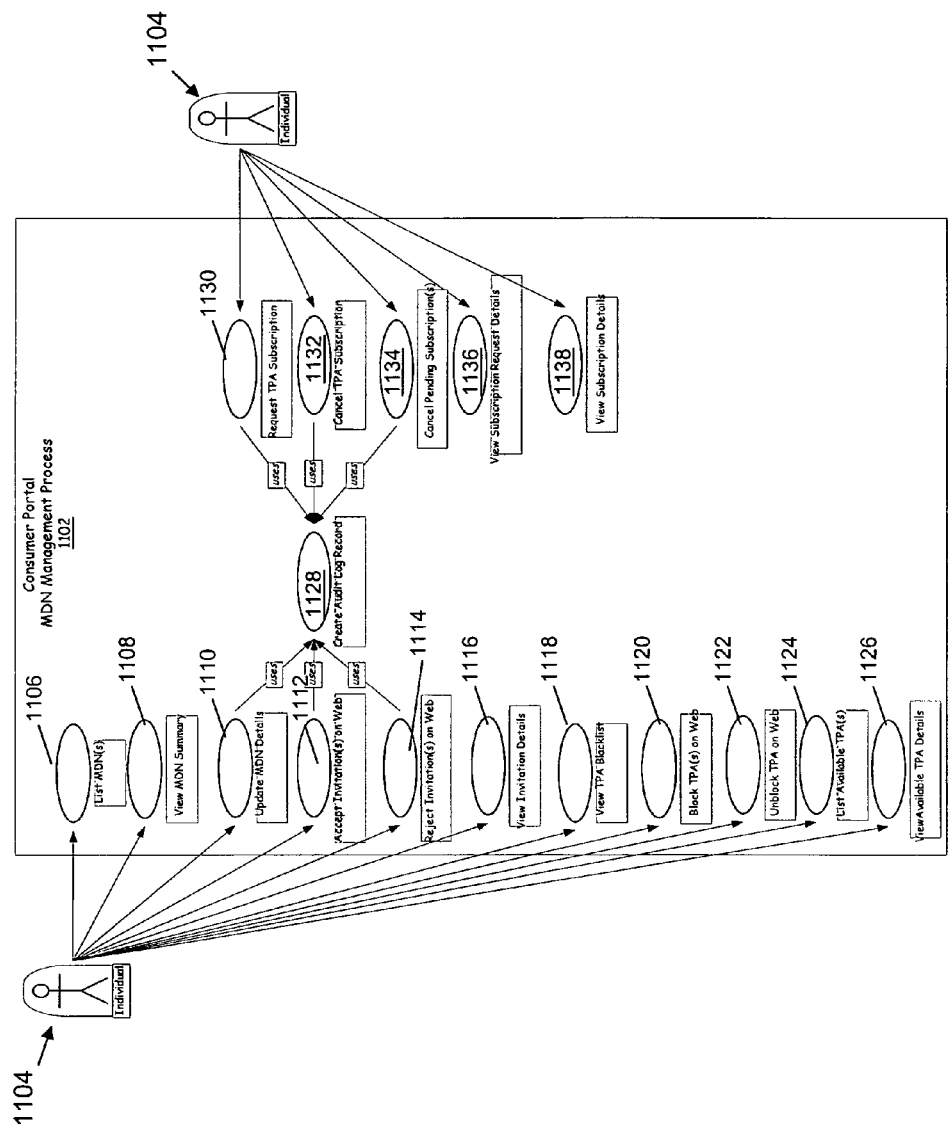
FIG. 11 illustrates a Consumer Portal MDN Management Process.

Referring now to FIG. 11, a Consumer Portal MDN Management Process (CPMMP) 1102 is depicted. CPMMP 1102 affords an individual user 1104 the ability to list MDNs (block 1106), view MDN summaries (block 1108), update MDN details (block 1110), accept invitations via the Web (block 1112), reject invitations via the Web (block 1114), view invitation details (block 1116), view TPA blacklists (block 1118), block TPA(s) via the Web (block 1120), unblock TPAs via the Web (block 1122), list available TPA(s) (block 1124), view available TPA details (block 1126), create an audit log record (block 1128), request a TPA subscription (block 1130), cancel a TPA subscription (block 1132), cancel a pending subscription (block 1134), view a subscription request detail (block 1136), and view subscription details (block 1138).

In block 1108, user 1104 is able to specify an MDN and view summary information for the MDN (used by user 1104). This includes MDN Details such as Management Permissions Flag and V/TMS Notification of Invitation Options and lists of Invites, Requests, Subscriptions and Blocked TPAs for the MDN.

Figure 12:
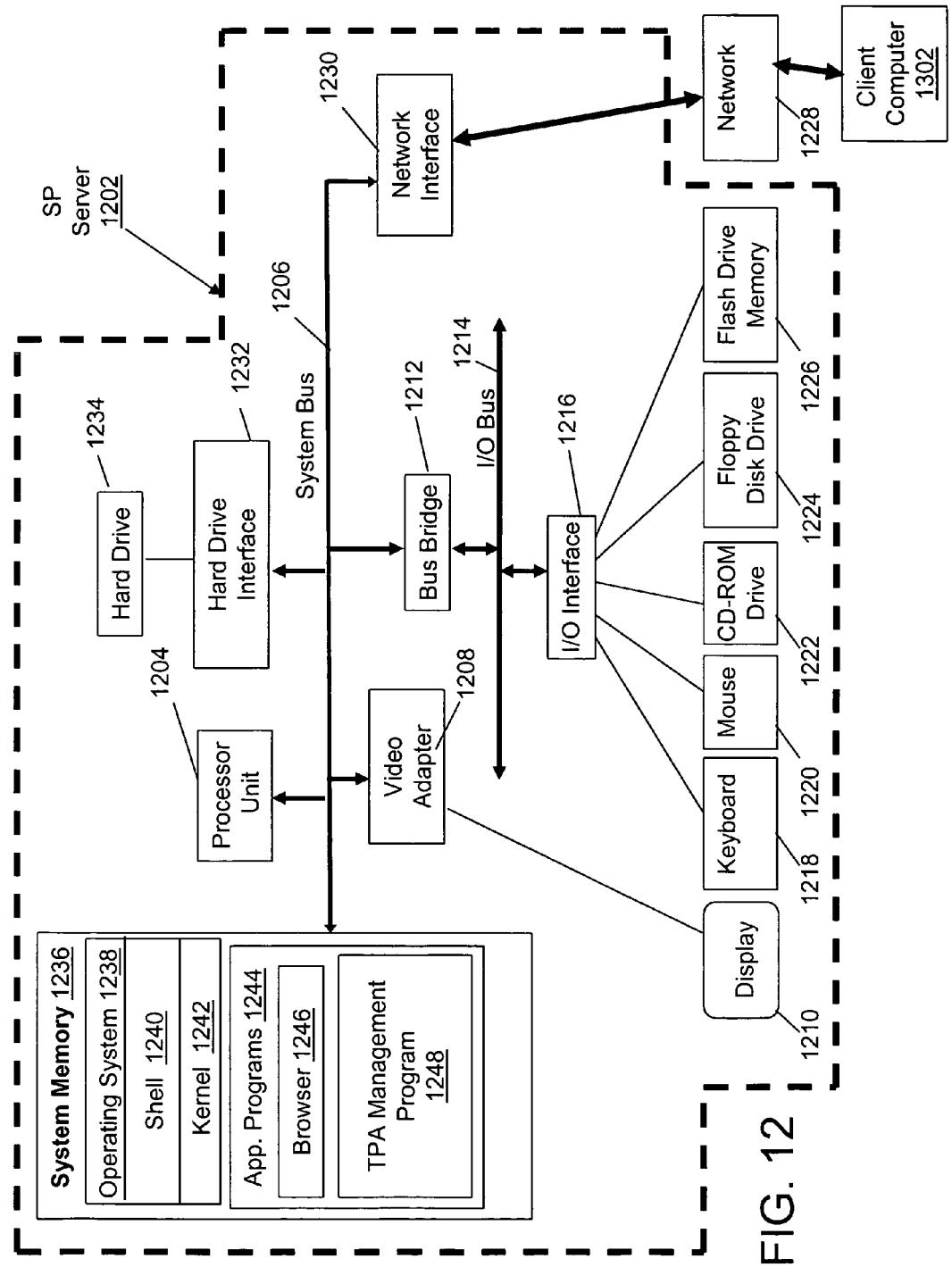
FIG. 12 illustrates an exemplary computer in which the present invention may be implemented.

With reference now to FIG. 12, there is depicted a block diagram of an exemplary Service Provider (SP) server 1202 that can be used to process and/or send to a client computer 1302 a TPA Management Program 1248, which performs some or all of the functions described above in FIGS. 3-11, including but not limited to deploying TPAs, sending invitations to MDNs to subscribe to offered TPA services, etc. SP server 1202 includes a processor unit 1204 coupled to a system bus 1206. Also coupled to system bus 1206 is a video adapter 1208, which drives/supports a display 1210. System bus 1206 is coupled via a bus bridge 1212 to an Input/Output (I/O) bus 1214. Coupled to I/O bus 1214 is an I/O interface 1216, which affords communication with various I/O devices, including a keyboard 1218, a mouse 1220, a Compact Disk-Read Only Memory (CD-ROM) drive 1222, a floppy disk drive 1224, and a flash drive memory 1226. The format of the ports connected to I/O interface 1216 may be any known to those skilled in the art of computer architecture, including but not limited to Universal Serial Bus (USB) ports.

SP server 1202 is able to communicate with a client computer 1302 via a network 1228 using a network interface 1230, which is coupled to system bus 1206. Preferably, network 1228 is the Internet.

Also coupled to system bus 1206 is a hard drive interface 1232, which interfaces with a hard drive 1234. In a preferred embodiment, hard drive 1234 populates a system memory 1236, which is also coupled to system bus 1206. Data that populates system memory 1236 includes SP server 1202's operating system 1238, which includes a command interpreter program known as a shell 1240, which is incorporated in a higher level operating system layer and utilized for providing transparent user access to resources such as application programs 1244, which include a browser 1246, and a TPA Management Program 1248.

As is well known in the art, a command interpreter or "shell" is generally a program that provides an interpreter and interfaces between the user and the operating system. More specifically, a shell program executes commands that are entered into a command line user interface or from a file.

The shell (UNIX) or command processor (Windows) is generally the highest level of the operating system software hierarchy and serves as a command interpreter. The shell typically provides a system prompt, interprets commands entered by keyboard, mouse, or other user input media, and sends the interpreted command(s) to the appropriate lower levels of the operating system (e.g., a kernel 1242) for processing.

Exemplary application programs 1244 used in the present invention are web browser 1246 and TPA Management Program 1248. Web browser 1246 includes program modules and instructions enabling a World Wide Web (WWW) client (i.e., client computer 1302) to send and receive network messages to the Internet using HyperText Transfer Protocol (HTTP) messaging. TPA Management Program 1248 performs the steps described in detail in the figures and description provided above, as well as Graphical User Interfaces (GUIs) associated with the described process.

The hardware elements depicted in SP server 1202 are not intended to be exhaustive, but rather are representative to highlight essential components required by the present invention. For instance, SP server 1202 may include alternate memory storage devices such as magnetic cassettes, Digital Versatile Disks (DVDs), Bernoulli cartridges, and the like. These and other variations are intended to be within the spirit and scope of the present invention.

Figure 13:
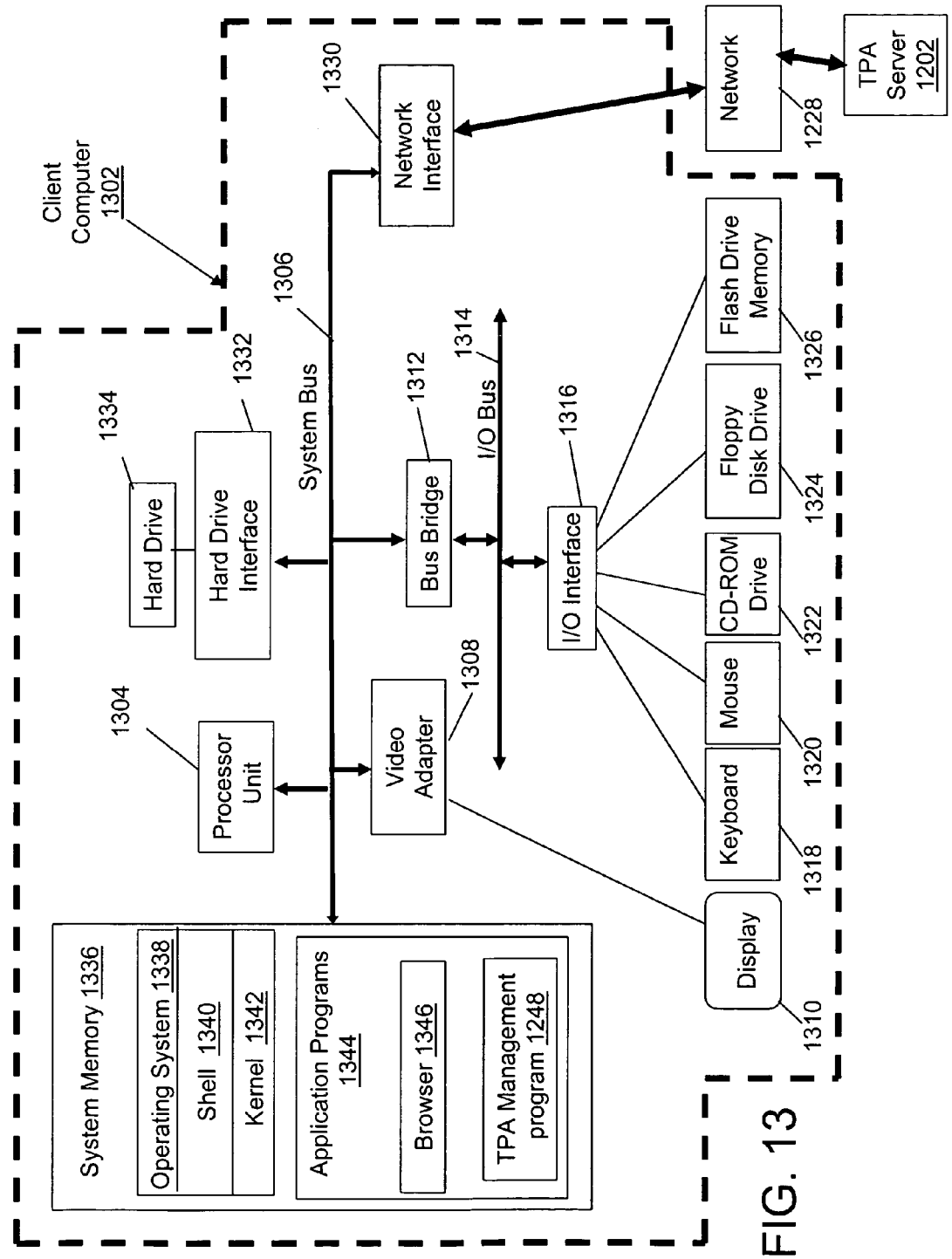
FIG. 13 depicts an exemplary server from which software for executing the present invention may be deployed.

With reference now to FIG. 13, there is depicted a block diagram of an exemplary client computer 1302, which is an exemplary computer for either a client (enterprise) of a third party administrator (service provider) or the service provider itself. Client computer 1302 includes a processor unit 1304 coupled to a system bus 1306. Also coupled to system bus 1306 is a video adapter 1308, which drives/supports a display 1310. System bus 1306 is coupled via a bus bridge 1312 to an Input/Output (I/O) bus 1314. Coupled to I/O bus 1314 is an I/O interface 1316, which affords communication with various I/O devices, including a keyboard 1318, a mouse 1320, a Compact Disk-Read Only Memory (CD-ROM) drive 1322, a floppy disk drive 1324, and a flash drive memory 1326. The format of the ports connected to I/O interface 1316 may be any known to those skilled in the art of computer architecture, including but not limited to Universal Serial Bus (USB) ports.

Client computer 1302 is able to communicate with SP server 1202 via network 1228 using a network interface 1330, which is coupled to system bus 1306.

Also coupled to system bus 1306 is a hard drive interface 1332, which interfaces with a hard drive 1334. In a preferred embodiment, hard drive 1334 populates a system memory 1336, which is also coupled to system bus 1306. Data that populates system memory 1336 includes client computer 1302's operating system 1338, which includes a shell 1340 and a kernel 1342, for providing transparent user access to resources such as application programs 1344, which include a browser 1346. Optionally, client computer 1302's system memory 1336 may include the TPA Management Program 1248 described above.

The hardware elements depicted in client computer 1302 are not intended to be exhaustive, but rather are representative to highlight essential components required by the present invention. For instance, client computer 1302 may include alternate memory storage devices such as magnetic cassettes, Digital Versatile Disks (DVDs), Bernoulli cartridges, and the like. These and other variations are intended to be within the spirit and scope of the present invention.

It should be understood that at least some aspects of the present invention may alternatively be implemented in a computer-readable medium (preferably tangible) that contains a program product capable of executing the above described steps. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Figure 14A:
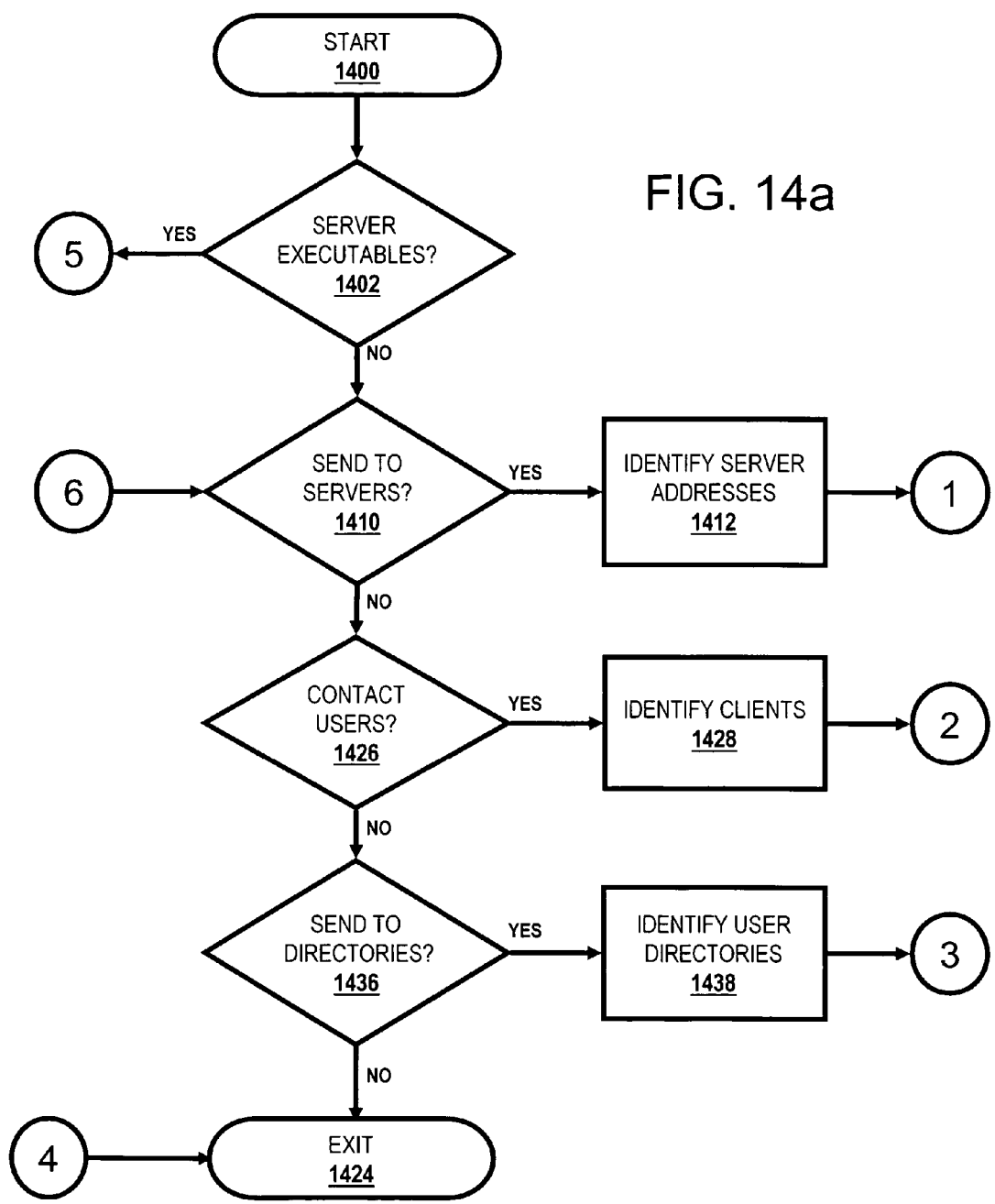
FIGS. 14a-b show a flow-chart of steps taken to deploy software capable of executing the steps shown in FIGS. 1-8.
Figure 14B:
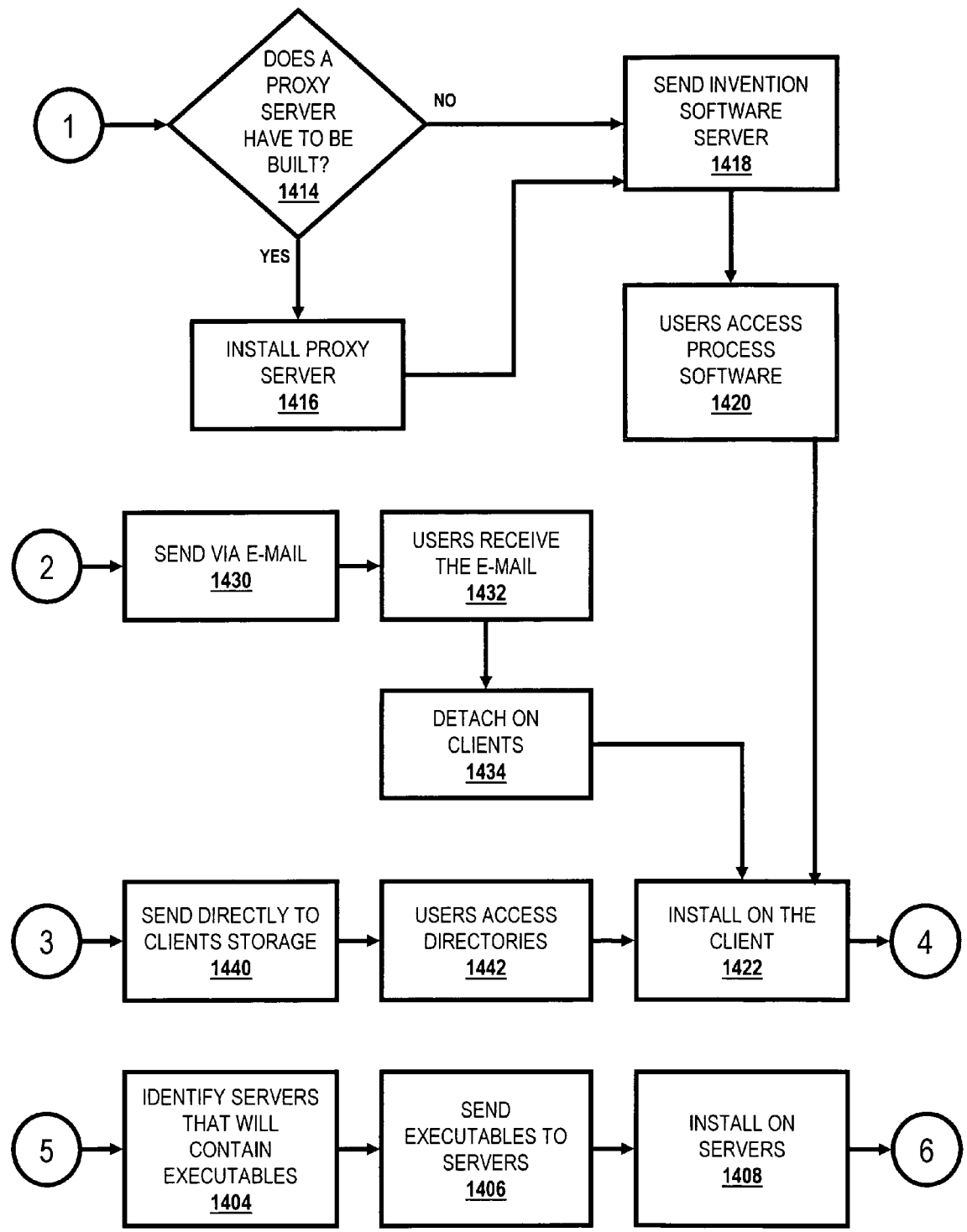

Thus, the method described herein, and in particular as shown in FIGS. 3-11, can be deployed as a process software. Referring now to FIG. 14, step 1400 begins the deployment of the process software. The first thing is to determine if there are any programs that will reside on a server or servers when the process software is executed (query block 1402). If this is the case, then the servers that will contain the executables are identified (block 1404). The process software for the server or servers is transferred directly to the servers' storage via File Transfer Protocol (FTP) or some other protocol or by copying though the use of a shared file system (block 1406). The process software is then installed on the servers (block 1408).

Next, a determination is made on whether the process software is be deployed by having users access the process software on a server or servers (query block 1410). If the users are to access the process software on servers, then the server addresses that will store the process software are identified (block 1412).

A determination is made if a proxy server is to be built (query block 1414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 1418). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 1420). Another embodiment is to have the servers automatically copy the process software to each client and then run the installation program for the process software at each client computer. The user executes the program that installs the process software on his client computer (block 1122) then exits the process (terminator block 1424).

In query step 1426, a determination is made whether the process software is to be deployed by sending the process software to users via e-mail. The set of users where the process software will be deployed are identified together with the addresses of the user client computers (block 1428). The process software is sent via e-mail to each of the users' client computers (block 1430). The users then receive the e-mail (block 1432) and then detach the process software from the e-mail to a directory on their client computers (block 1434). The user executes the program that installs the process software on his client computer (block 1422) then exits the process (terminator block 1424).

Lastly a determination is made on whether to the process software will be sent directly to user directories on their client computers (query block 1436). If so, the user directories are identified (block 1438). The process software is transferred directly to the user's client computer directory (block 1440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 1442). The user executes the program that installs the process software on his client computer (block 1422) and then exits the process (terminator block 1424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 15A:
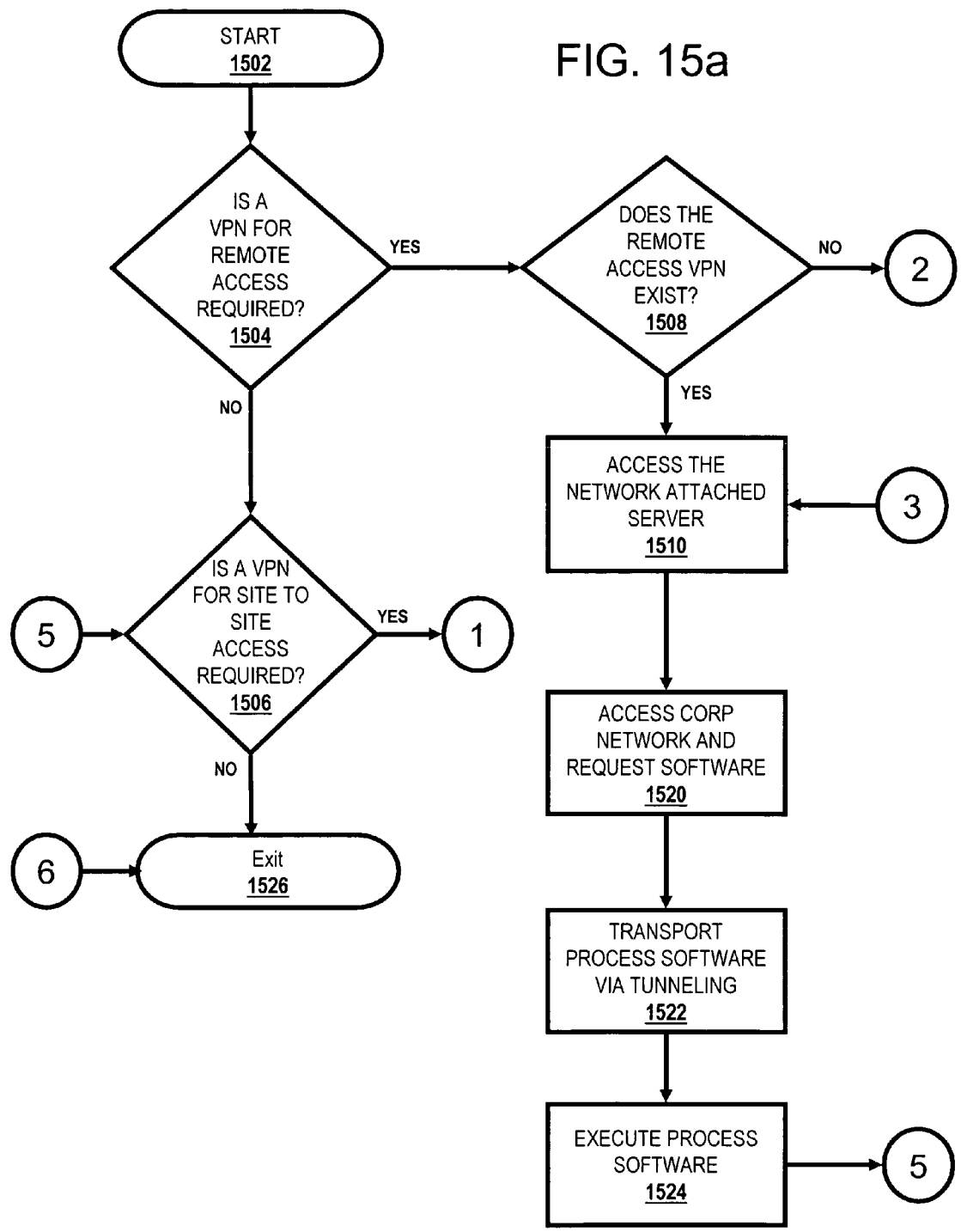
FIGS. 15a-c show a flow-chart of steps taken to deploy in a Virtual Private Network (VPN) software tat is capable of executing the steps shown in FIGS. 1-8.
Figure 15B:
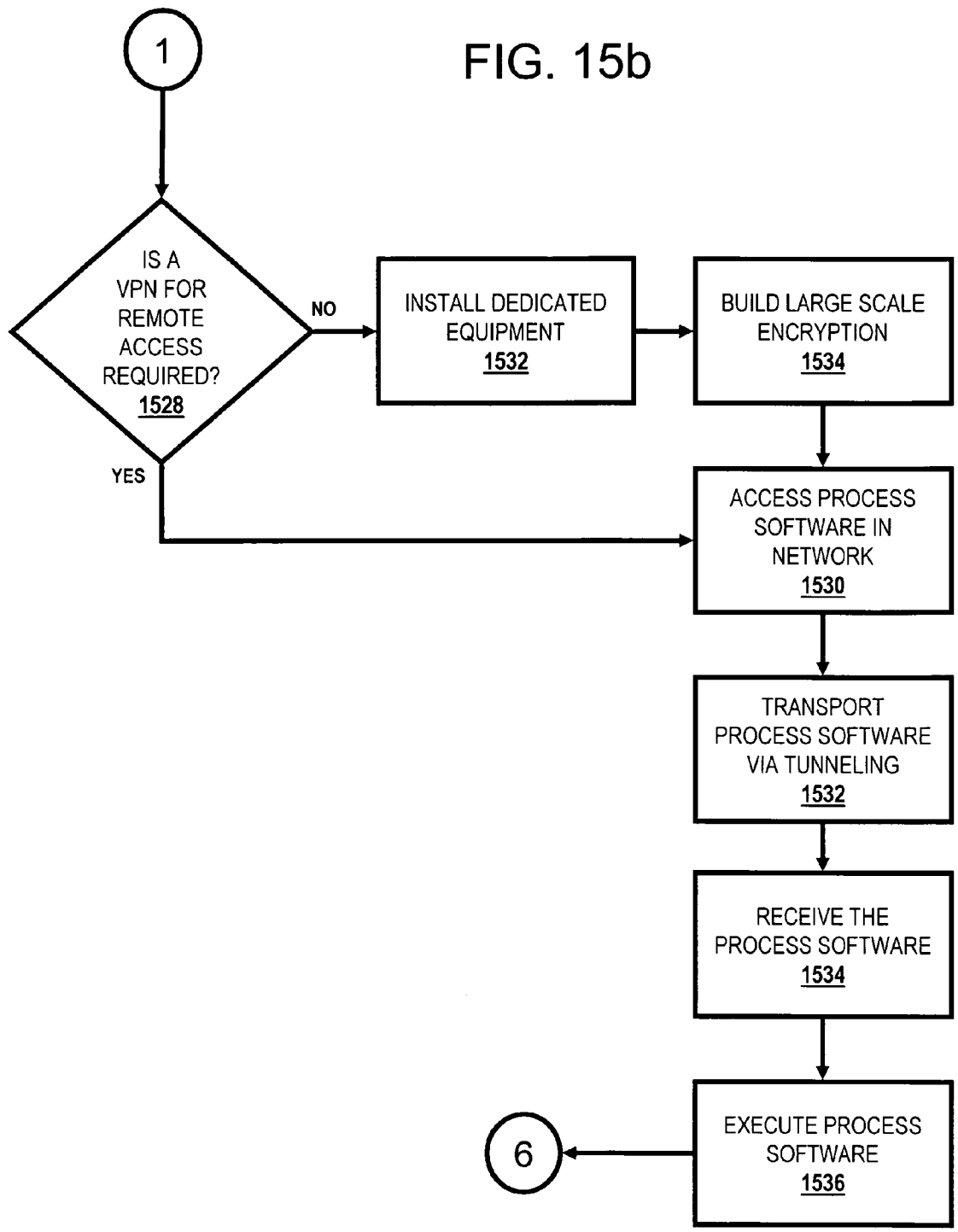
Figure 15C:
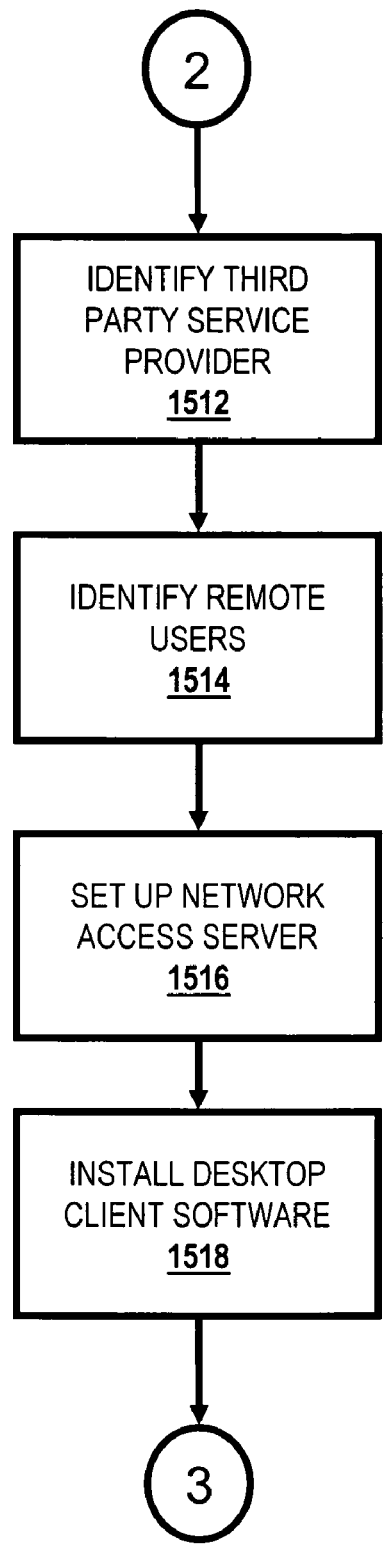

The process for such VPN deployment is described in FIG. 15. Initiator block 1502 begins the Virtual Private Network (VPN) process. A determination is made to see if a VPN for remote access is required (query block 1504). If it is not required, then proceed to (query block 1506). If it is required, then determine if the remote access VPN exists (query block 1508).

If a VPN does exist, then proceed to block 1510. Otherwise identify a third party provider that will provide the secure, encrypted connections between the company's private network and the company's remote users (block 1512). The company's remote users are identified (block 1514). The third party provider then sets up a network access server (NAS) (block 1516) that allows the remote users to dial a toll free number or attach directly via a broadband modem to access, download and install the desktop client software for the remote-access VPN (block 1518).

After the remote access VPN has been built or if it been previously installed, the remote users can access the process software by dialing into the NAS or attaching directly via a cable or DSL modem into the NAS (block 1510). This allows entry into the corporate network where the process software is accessed (block 1520). The process software is transported to the remote user's desktop over the network via tunneling. That is the process software is divided into packets and each packet including the data and protocol is placed within another packet (block 1522). When the process software arrives at the remote user's desktop, it is removed from the packets, reconstituted and then is executed on the remote users desktop (block 1524).

A determination is then made to see if a VPN for site to site access is required (query block 1506). If it is not required, then proceed to exit the process (terminator block 1526). Otherwise, determine if the site to site VPN exists (query block 1528). If it does exist, then proceed to block 1530. Otherwise, install the dedicated equipment required to establish a site to site VPN (block 1532). Then build the large scale encryption into the VPN (block 1534).

After the site to site VPN has been built or if it had been previously established, the users access the process software via the VPN (block 1530). The process software is transported to the site users over the network via tunneling (block 1532). That is the process software is divided into packets and each packet including the data and protocol is placed within another packet (block 1534). When the process software arrives at the remote user's desktop, it is removed from the packets, reconstituted and is executed on the site users desktop (block 1536). The process then ends at terminator block 1526.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 16A:
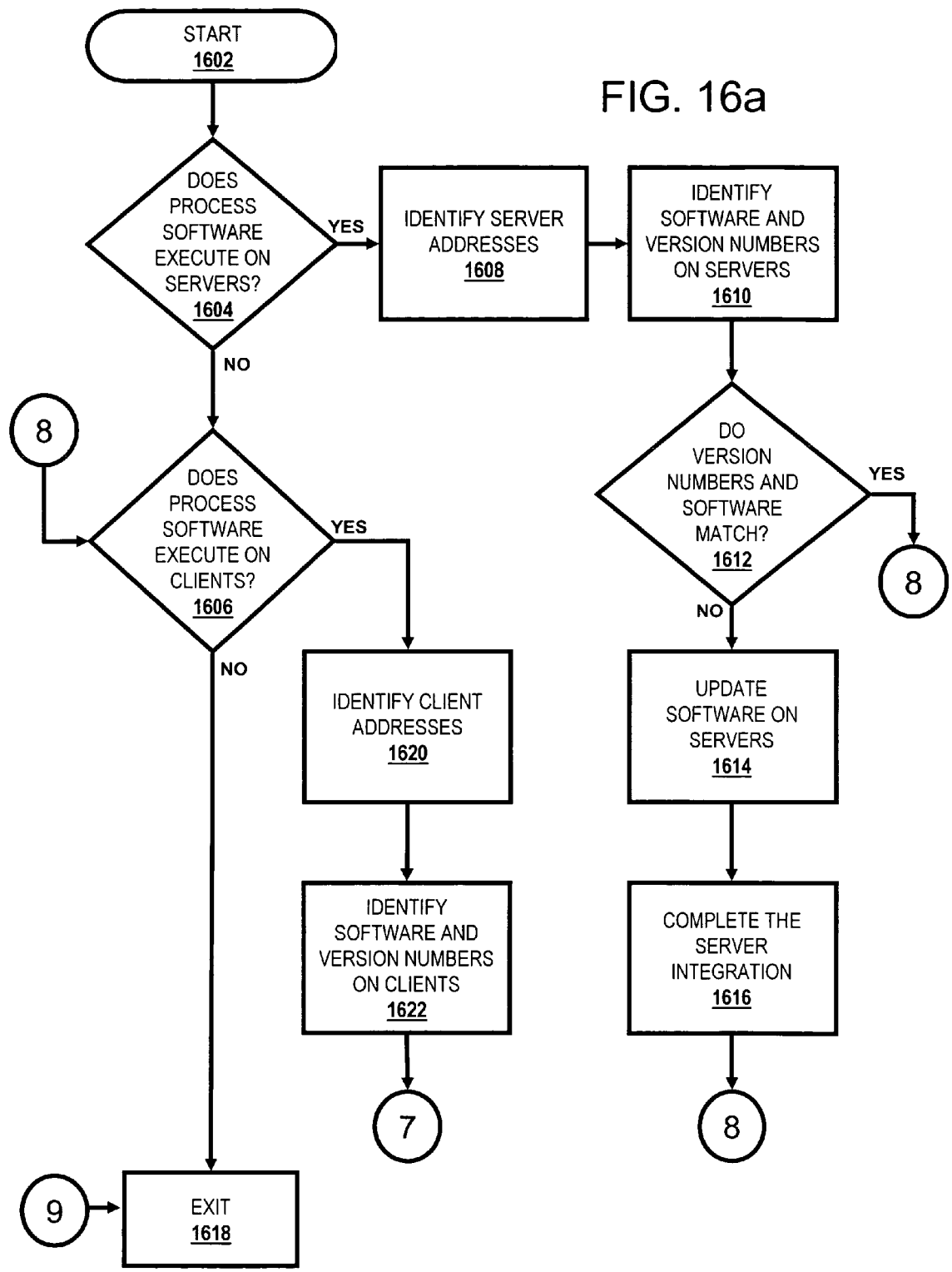
FIGS. 16a-b show a flow-chart showing steps taken to integrate into an computer system software that is capable of executing the steps shown in FIGS. 1-8.
Figure 16B:
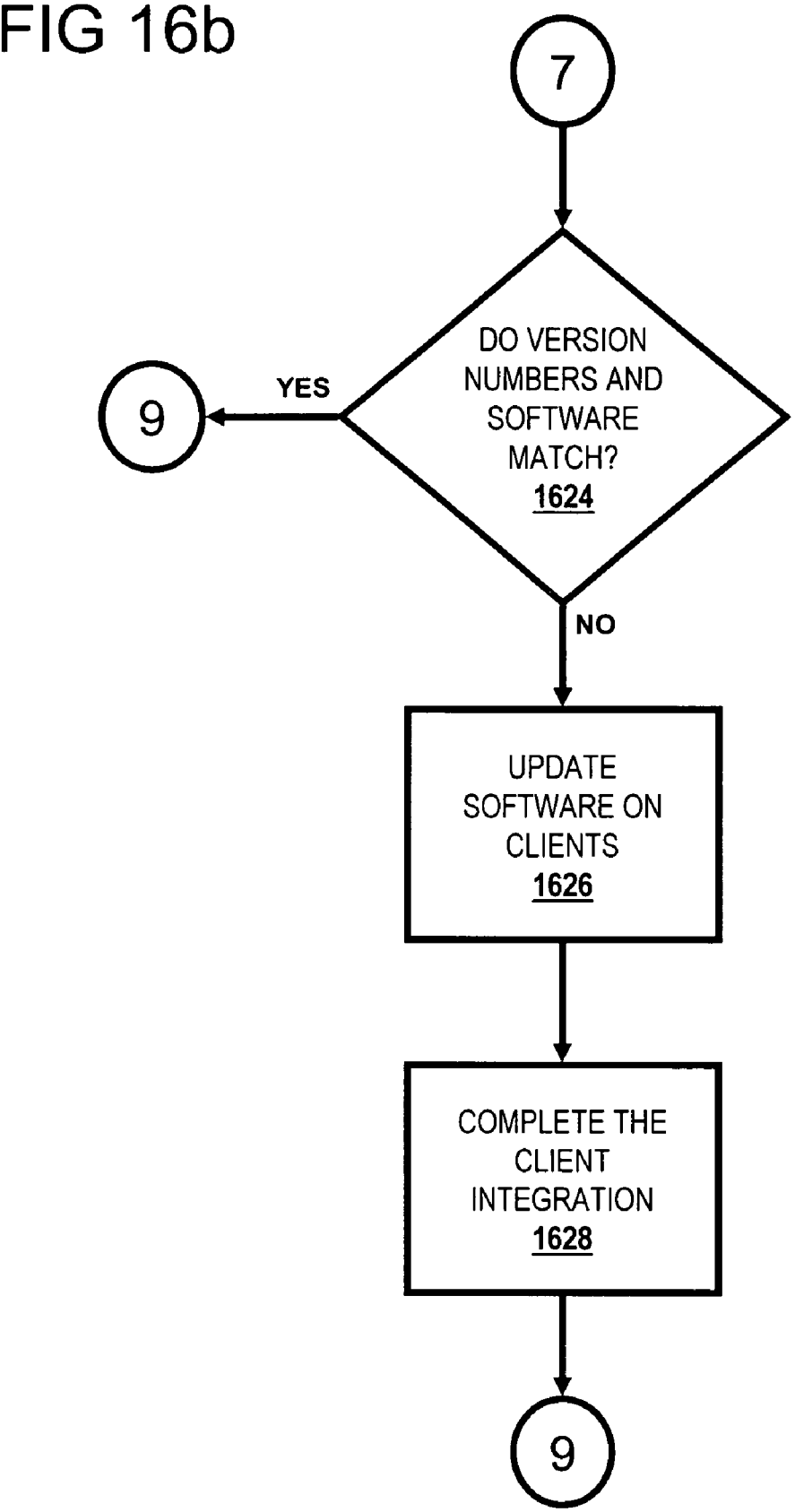

For a high-level description of this process, reference is now made to FIG. 16. Initiator block 1602 begins the integration of the process software. The first thing is to determine if there are any process software programs that will execute on a server or servers (block 1604). If this is not the case, then integration proceeds to query block 1606. If this is the case, then the server addresses are identified (block 1608). The servers are checked to see if they contain software that includes the operating system (OS), applications, and Network Operating Systems (NOS), together with their version numbers, which have been tested with the process software (block 1610). The servers are also checked to determine if there is any missing software that is required by the process software in block 1610.

A determination is made if the version numbers match the version numbers of OS, applications and NOS that have been tested with the process software (block 1612). If all of the versions match and there is no missing required software the integration continues in query block 1606.

If one or more of the version numbers do not match, then the unmatched versions are updated on the server or servers with the correct versions (block 1614). Additionally if there is missing required software, then it is updated on the server or servers in the step shown in block 1614. The server integration is completed by installing the process software (block 1616).

The step shown in query block 1606, which follows either the steps shown in block 1604, 1612 or 1616, determines if there are any programs of the process software that will execute on the clients. If no process software programs execute on the clients the integration proceeds to terminator block 1618 and exits. If this not the case, then the client addresses are identified as shown in block 1620.

The clients are checked to see if they contain software that includes the operating system (OS), applications, and network operating systems (NOS), together with their version numbers, which have been tested with the process software (block 1622). The clients are also checked to determine if there is any missing software that is required by the process software in the step described by block 1622.

A determination is made is the version numbers match the version numbers of OS, applications and NOS that have been tested with the process software (query block 1324). If all of the versions match and there is no missing required software, then the integration proceeds to terminator block 1618 and exits.

If one or more of the version numbers do not match, then the unmatched versions are updated on the clients with the correct versions (block 1626). In addition, if there is missing required software then it is updated on the clients (also block 1626). The client integration is completed by installing the process software on the clients (block 1628). The integration proceeds to terminator block 1618 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 17A:
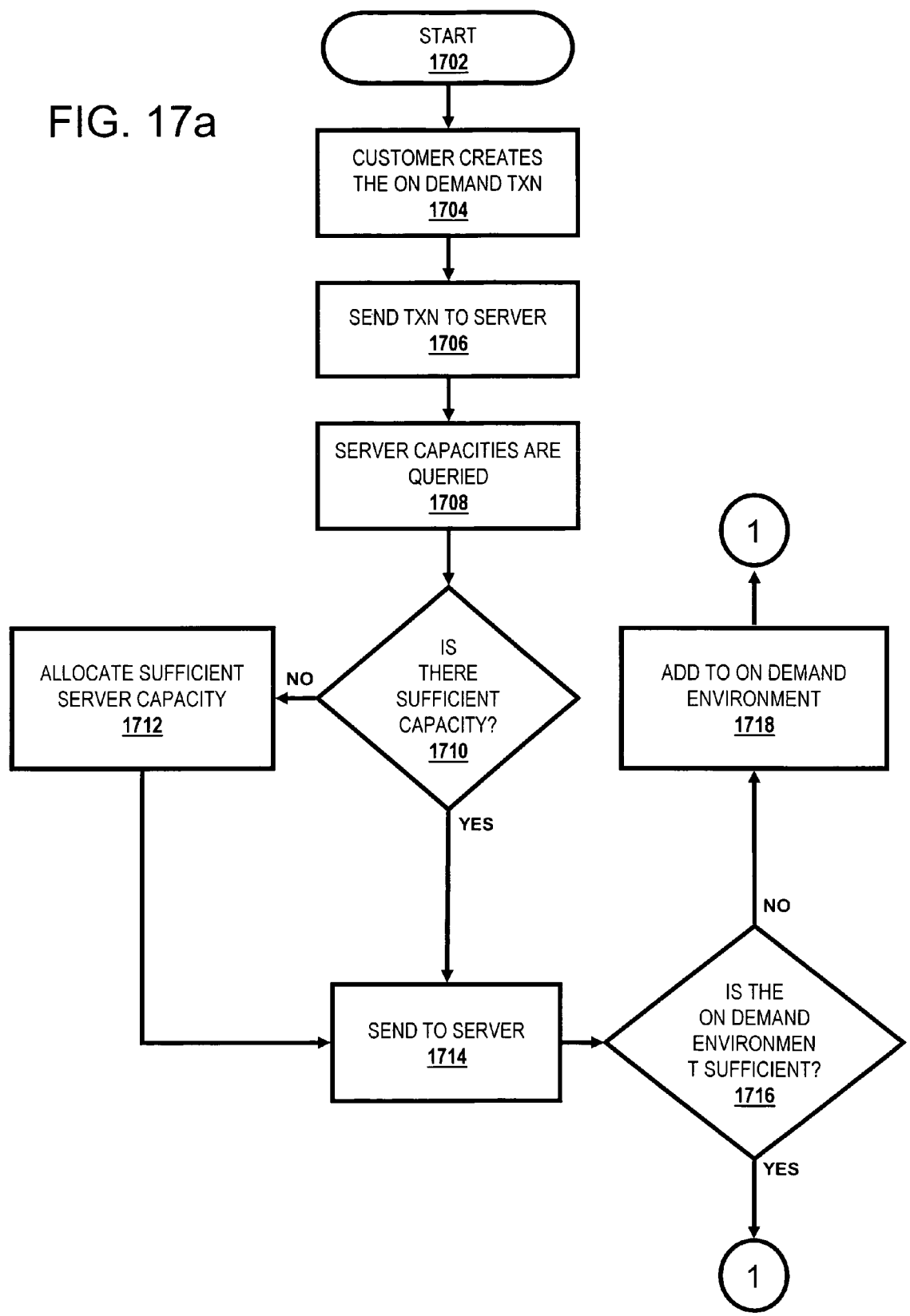
FIGS. 17a-b show a flow-chart showing steps taken to execute the steps shown in FIGS. 1-8 using an on-demand service provider.
Figure 17B:
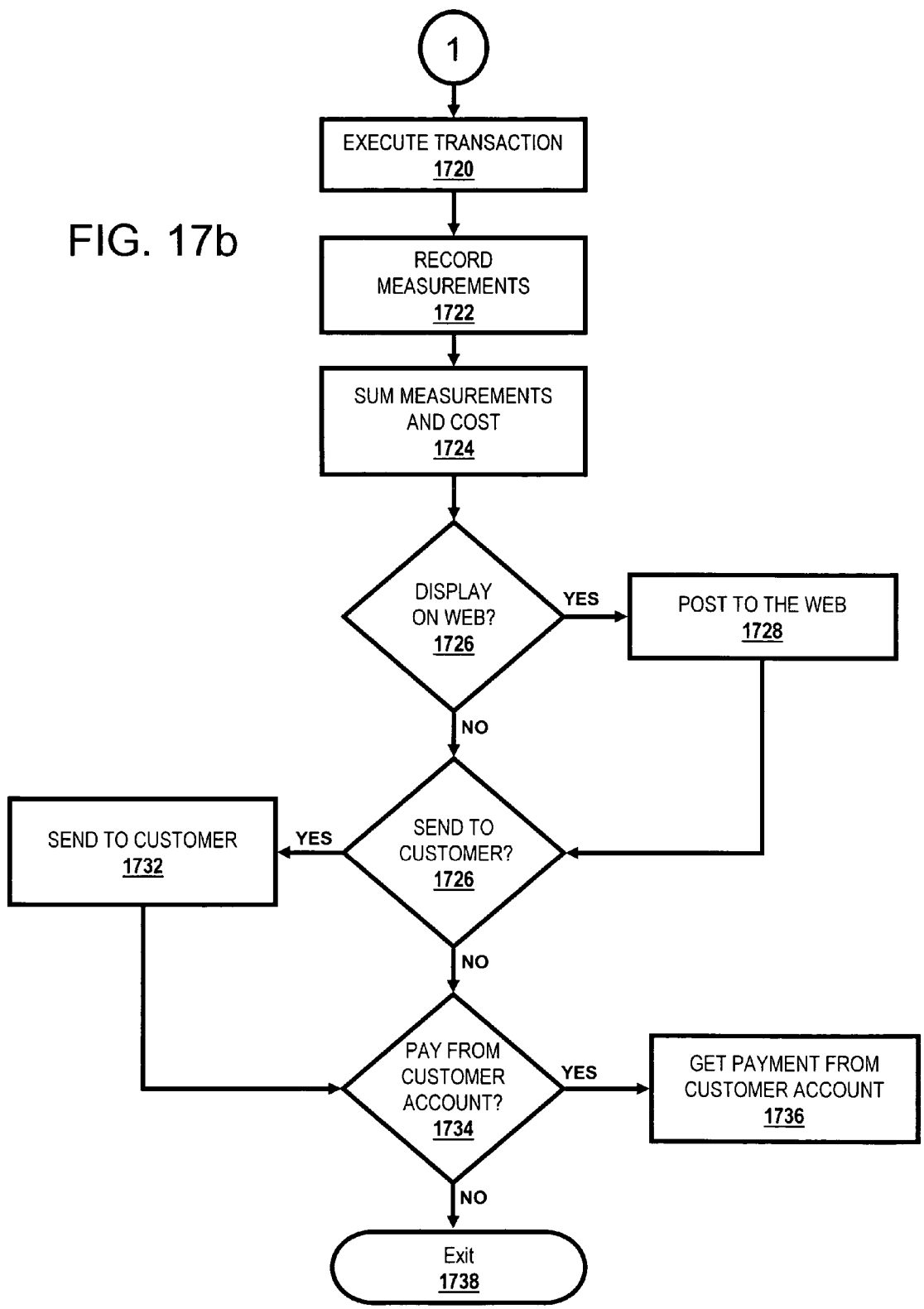

With reference now to FIG. 17, initiator block 1702 begins the On Demand process. A transaction is created than contains the unique customer identification, the requested service type and any service parameters that further specify the type of service (block 1704). The transaction is then sent to the main server (block 1706). In an On Demand environment the main server can initially be the only server, then as capacity is consumed other servers are added to the On Demand environment.

The server central processing unit (CPU) capacities in the On Demand environment are queried (block 1708). The CPU requirement of the transaction is estimated, then the servers available CPU capacity in the On Demand environment are compared to the transaction CPU requirement to see if there is sufficient CPU available capacity in any server to process the transaction (query block 1710). If there is not sufficient server CPU available capacity, then additional server CPU capacity is allocated to process the transaction (block 1712). If there was already sufficient Available CPU capacity then the transaction is sent to a selected server (block 1714).

Before executing the transaction, a check is made of the remaining On Demand environment to determine if the environment has sufficient available capacity for processing the transaction. This environment capacity consists of such things as but not limited to network bandwidth, processor memory, storage etc. (block 1716). If there is not sufficient available capacity, then capacity will be added to the On Demand environment (block 1718). Next the required software to process the transaction is accessed, loaded into memory, then the transaction is executed (block 1720).

The usage measurements are recorded (block 1722). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1724).

If the customer has requested that the On Demand costs be posted to a web site (query block 1726), then they are posted (block 1728). If the customer has requested that the On Demand costs be sent via e-mail to a customer address (query block 1730), then these costs are sent to the customer (block 1732). If the customer has requested that the On Demand costs be paid directly from a customer account (query block 1734), then payment is received directly from the customer account (block 1736). The On Demand process is then exited at terminator block 1738.

While the present invention has been described in a general manner, one exemplary preferred embodiment of the inventions implementation is with the use of Instant Messenger (IM), in which users are able to type messages back and forth in real time over the Internet to other IM users that are on their "buddy list" of authorized IM users (who are in a same IM community/family). For purposes of example, assume that the TPA described above is designed to work with an IM program. An exemplary TPA would provide an option that shows 1) which persons on a user's "buddy list" are currently available for IM messages; 2) that a specific person on the active "buddy list" is available for text messages on his cell phone; 3) the current location of the cell phone using buddy; and 4) an option to send a text message to the cell phone using buddy. The option to send the text message should include a notice to the sender that there may be (or specifically is—with the amount shown to the sender) a charge for sending the IM message.

The current location of the cell phone using buddy (element 3 shown in the preceding paragraph) is provided by reading the "here I am" ping from the cell phone, which is received by a specific cell tower, which then provides the necessary information about the current location of the cell phone using buddy. Since current federal regulations restrict public access to such data, the cell phone using buddy needs to provide the TPA and/or the IM program permission, preferably via one of the TPA managers described above (NA, TA, TM).

Thus, the present invention can be used to allow a TPA manager 1) to obtain permission to bill a user for sending an IM message and 2) to obtain permission to determine a real-time location of a cell phone using IM "buddy."

While the invention has been particularly shown and described with reference to a preferred embodiment, it will be understood by those skilled in the art that various changes in form and detail may be made therein without departing from the spirit and scope of the invention.

What is claimed is:

1. A method for managing access to Third Party Applications (TPAs) on a telecommunications network, the method comprising:

accessing a worklist page that shows a list of all Third Party Applications (TPAs) that are on a telecommunications Service Delivery Platform (SDP);

wherein the worklist page comprises a first list of all pending invitations to the multiple mobile devices to subscribe to one or more of the TPAs, a second list of all TPAs that are currently available to be contacted, a third list of all pending requests from the multiple mobile devices to subscribe to one or more of the TPAs, and a fourth list of new mobile devices that have recently been added to the telecommunication network;

broadcasting an invitation to multiple mobile devices to subscribe to one or more of the TPAs;

in response to a mobile device returning a message accepting the invitation to subscribe to one of the TPAs, determining a level of access to the one of the TPAs that the accepting mobile device has accepted the subscription thereto; and providing access, to the accepting mobile device, to the TPA at an authorized access level.

2. The method of claim 1, wherein any mobile device that is listed on a blacklist for a specific TPA is barred from accessing that specific TPA.

3. The method of claim 1, wherein the invitations are broadcast using text messaging via a Voice/Text Message System (V/TMS) in the SDP.

4. The method of claim 1, wherein the invitations are broadcast using voice messaging via a Voice/Text Message System (V/TMS) in the SDP.

5. The method of claim 1, wherein the SDP is part of a Telecommunications Service Provider (TSP), wherein the TSP also includes a TSP owner.

6. The method of claim 5, wherein the TSP owner includes a Network Administrator (NA), and wherein said NA controls which mobile devices are authorized to access a TPA.

7. The method of claim 1, wherein the TPAs are from a Third Party Enterprise (TPE) that autonomously controls, independently of the TSP, which mobile devices are authorized to access TPAs in the SDP.

8. The method of claim 7, wherein the TPE has a Telecommunications Manager (TM) that controls which mobile device is authorized to subscribe to a TPA.

9. The method claim 7, wherein the access level authorized for an accepting mobile device is determined by consulting a Consumer Data and Privacy Management (CD&PM) database.

10. The method of claim 1, wherein an invitation to subscribe to a TPA is cancelled after a pre-determined period of time.

11. The method of claim 1, wherein broadcasting the invitation is performed by the telecommunications SDP.

12. The method of claim 1, further comprising:

querying, by the telecommunications SDP, a Telecom Administrator (TA) for permission to broadcast the invitation to multiple mobile devices used by employees of an enterprise, wherein the TA administers access to the multiple mobile devices used by employees of the enterprise; and in response to the TA granting the telecommunications SDP permission, broadcasting the invitation to the multiple mobile devices used by employees of the enterprise.

13. The method of claim 12, further comprising:

in response to the TA denying the telecommunications SDP permission, blocking the invitation to multiple mobile devices used by employees of an enterprise.

14. The method of claim 1, wherein the TPA remains available to other mobile devices after a pre-determined period of time expires.

15. The method of claim 1, wherein the worklist page comprises a first list of all pending invitations to the multiple mobile devices to subscribe to one or more of the TPAs, a second list of all TPAs that are currently available to be contacted, a third list of all pending requests from the multiple mobile devices to subscribe to one or more of the TPAs, and a fourth list of new mobile devices that have recently been added to the telecommunication network.

16. The method of claim 1, wherein one of the TPAs is an Instant Messenger (IM) program, wherein the IM program enables multiple users to type messages back and forth in real time to cell phones of other IM users that are on a same buddy list of authorized IM users, and wherein the IM program provides a user with information showing:

1) which persons on a buddy list of the user are currently available for IM messages;

2) that a specific person on the buddy list of the user is available for text messages to be received on a cell phone used by the specific person;

3) a current location of the specific person who is available for text messages to be received; and 4) an option to send a text message to the specific person, wherein the option to send the text message to the specific person includes a notice to there will be a charge for sending the text message to the specific person, wherein the charge will be levied against the user who sends the text message.

17. A computer-readable storage medium having a plurality of instructions processable, by a machine embodied therein, wherein said plurality of instructions, when processed by said machine causes said machine to perform a method for managing access to Third Party Applications (TPAs) on a telecommunications network, the method comprising:

accessing a worklist page that shows a list of all Third Party Applications (TPAs) that are on a telecommunications Service Delivery Platform (SDP);

wherein the worklist page comprises a first list of all pending invitations to the multiple mobile devices to subscribe to one or more of the TPAs, a second list of all TPAs that are currently available to be contacted, a third list of all pending requests from the multiple mobile devices to subscribe to one or more of the TPAs, and a fourth list of new mobile devices that have recently been added to the telecommunication network;

broadcasting an invitation to multiple mobile devices to subscribe to one or more of the TPAs;

in response to a mobile device returning a message accepting the invitation to subscribe to one of the TPAs, determining a level of access to the one of the TPAs that the accepting mobile device has accepted the subscription thereto; and providing access, to the accepting mobile device, to the TPA at an authorized access level.

18. The computer-readable storage medium of claim 17, wherein any mobile device that is listed on a blacklist for a specific TPA is barred from accessing that specific TPA.

19. The computer-readable storage medium of claim 17, wherein the invitations are broadcast using text messaging via a Voice/Text Message System (V/TMS) in the SDP.

20. The computer-readable storage medium of claim 17, wherein the processable instructions are provided by a service provider to a customer on an on-demand basis, wherein the on-demand basis is determined by evaluating a Central Processing Unit (CPU) capacity of a server computer, and wherein if sufficient CPU capacity at the server computer is not available to receive the computer program code, allocating additional CPU capacity from another CPU in the server computer to receive and process the computer program code.

* * * * *